US010606586B2

(12) United States Patent
Majumdar et al.

(10) Patent No.: US 10,606,586 B2
(45) Date of Patent: Mar. 31, 2020

(54) APPLICATION ARCHITECTURE GENERATION

(71) Applicant: ACCENTURE GLOBAL SOLUTIONS LIMITED, Dublin (IE)

(72) Inventors: Amritendu Majumdar, Koperkhairne (IN); Ashutosh Tripathi, Bangalore (IN); Badrinath Bahadur, Pune (IN); Joel Samuel Kore, Camp Pune (IN); Kavita Bhatt, Bangalore (IN); Pankaj Shrikant Nikumb, Pune (IN); Parikshit Maniar, Bangalore (IN); Soumin Nikhra, Bangalore (IN); Vimal Venugopalan, Pune (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 80 days.

(21) Appl. No.: 15/708,468

(22) Filed: Sep. 19, 2017

(65) Prior Publication Data
US 2019/0042233 A1 Feb. 7, 2019

(30) Foreign Application Priority Data
Aug. 1, 2017 (IN) .............................. 201711027327

(51) Int. Cl.
*G06F 9/44* (2018.01)
*G06F 8/77* (2018.01)
*G06F 8/20* (2018.01)

(52) U.S. Cl.
CPC .................. *G06F 8/77* (2013.01); *G06F 8/20* (2013.01); *G06F 8/24* (2013.01)

(58) Field of Classification Search
None
See application file for complete search history.

(56) References Cited

U.S. PATENT DOCUMENTS

| 2002/0095650 | A1* | 7/2002 | Green | G06F 8/20 717/104 |
| 2004/0123271 | A1* | 6/2004 | Bindewald | G06F 11/362 717/124 |

(Continued)

OTHER PUBLICATIONS

Morgan, Swift + Objective-C, 2015, medium.com.*

(Continued)

*Primary Examiner* — Insun Kang
(74) *Attorney, Agent, or Firm* — Mannava & Kang, P.C.

(57) ABSTRACT

In some examples, application architecture generation may include ascertaining, for a project, an input that includes project information, component information, and target information, and parsing the project information to determine whether the project is an existing project or a new project. Application architecture generation may further include generating a component list from the component information, ascertaining components from the component list, and mapping each of the ascertained components to a corresponding target determined from the target information. Further, application architecture generation may include analyzing a dependency for each of the ascertained components relative to at least one other component of the ascertained components, and generating, based on the mapping and the analyzed dependency, an integrated output that includes an architecture for an application associated with the project.

18 Claims, 47 Drawing Sheets

(56) References Cited

U.S. PATENT DOCUMENTS

| | | | | |
|---|---|---|---|---|
| 2006/0168557 | A1* | 7/2006 | Agrawal | G06F 8/20 717/104 |
| 2007/0124006 | A1* | 5/2007 | Tucker | G06F 8/24 700/90 |
| 2007/0168240 | A1* | 7/2007 | Alfandary | G06Q 10/087 717/102 |
| 2009/0249279 | A1* | 10/2009 | Bourdon | G06F 8/61 717/101 |
| 2010/0070556 | A1* | 3/2010 | Heusermann | G06Q 10/06 709/202 |
| 2011/0252395 | A1* | 10/2011 | Charisius | G06F 8/20 717/103 |
| 2011/0302565 | A1 | 12/2011 | Ferris et al. | |
| 2012/0311526 | A1* | 12/2012 | DeAnna | G06F 8/30 717/106 |
| 2013/0091484 | A1* | 4/2013 | Aryanto | G06F 8/20 717/101 |
| 2013/0305223 | A1* | 11/2013 | Eade | G06F 8/20 717/125 |
| 2014/0053138 | A1* | 2/2014 | Yassin | G06F 11/3672 717/126 |
| 2014/0223410 | A1* | 8/2014 | Hosono | G06F 9/5077 717/104 |
| 2014/0245262 | A1* | 8/2014 | Hill | G06F 8/70 717/120 |
| 2014/0282400 | A1* | 9/2014 | Moorthi | G06F 8/71 717/122 |
| 2014/0289391 | A1* | 9/2014 | Balaji | H04L 43/04 709/224 |
| 2015/0205603 | A1* | 7/2015 | Araya | G06F 8/51 717/136 |
| 2015/0220325 | A1* | 8/2015 | Poon | G06F 8/35 717/103 |
| 2015/0234642 | A1* | 8/2015 | Araya | G06F 8/51 717/137 |
| 2016/0134431 | A1* | 5/2016 | Ebrom | D06F 39/005 709/217 |
| 2016/0253166 | A1* | 9/2016 | Rubenstein | G06F 8/65 717/168 |
| 2016/0350105 | A1* | 12/2016 | Kumar | G06F 8/20 |
| 2016/0364212 | A1* | 12/2016 | Mohaban | G06Q 10/10 |
| 2017/0003937 | A1* | 1/2017 | Huebra | G06F 8/20 |
| 2017/0060537 | A1* | 3/2017 | Mack | G06F 8/20 |
| 2017/0075662 | A1* | 3/2017 | Eksten | G06F 8/70 |
| 2017/0139695 | A1* | 5/2017 | Govindaraju | G06F 8/60 |
| 2017/0228227 | A1* | 8/2017 | Winterfeldt | G06F 8/60 |
| 2017/0255454 | A1* | 9/2017 | Hassine | H04L 67/00 |
| 2018/0024814 | A1* | 1/2018 | Ouali | G06F 8/10 717/105 |
| 2018/0165122 | A1* | 6/2018 | Dobrev | G06F 8/60 |
| 2018/0210716 | A1* | 7/2018 | Bardini | G06Q 10/06 |
| 2018/0329693 | A1* | 11/2018 | Eksten | G06F 21/64 |
| 2018/0367363 | A1* | 12/2018 | Jaeger | H04L 41/02 |

OTHER PUBLICATIONS

Hadaytullah et al., Tool Support for Software Architecture Design with Genetic Algorithms, 2010 IEEE.*

Felix Javier Acero Salazar, "Model Driven Development of iOS Apps with IFML", Master of Science Engineering of Computer Systems of Politecnico di Milano, Dec. 1, 2014, pp. 1-135.

Samuel Nilsson, "Implementation of a Continuous Integration and Continuous Delivery System for Cross-Platform Mobile Application Development", Department of Computer Science, Linkoping University, SE, Jan. 1, 2016, pp. 1-45.

Tobias Binz, et al., "TOSCA:Protable Automated Deployment and Management of Cloud Applications", In: "Advanced Web Services", Aug. 6, 2013, Springer New York, pp. 527-549.

Wettinger Johannes, et al., "Standards-Based DevOps Automation and Integration Using TOSCA", IEEE Dec. 8, 2014, pp. 59-68.

* cited by examiner

Parse Arguments

FUNCTION ParseArgument( ARGV[ isExistingProject,projectPath,projectName,projectTemplate, listofDependency, targetType,dependencyType])

//Read argument values

1000 → isNewProject= ARGV[0]    //execution flow

1002 → ProjectPath= ARGV[1]    //Project Path

ProjectName= ARGV[2]    // Name of the project

ProjectTemplate= ARGV[3]    //Project template selected by the user listofDependency= ARGV[4]    // The list of dependencies added listofComponents= ARGV[5]    // The list of non-pod components added targetType=ARGV[6]    // Target type like iOS, watchOS or tvOS dependencyType =ARGV[7]    //Dependency type like carthage, POD etc.

END FUNCTION

FIG. 10

Generate Component List

1100 → FUNCTION GenerateComponentList(listOfComponents)
//declare array of component dictionary
componentArray[]
FOR component in listOfComponents            1104
    componentArray[i]= ParseJSON[component]
END FOR
    templateDict= ParseJSON[component]
END Function

1102 → FUNCTION ParseJSON (component)
//Read JSON content from MasterConfigurationFile
file=File.open (File.dirname(__FILE__) + '/MasterConfig.json')
//Raw file data
json= file.read()
//Invoke JSON.parse library function
parsedContent= JSON.parse(json)
componentDict= lookUpComponent (parsedContent, component)
return ComponentDict
END FUNCTION FUNCTION lookUpComponent( parsed, ComponentName, *rest)
//The lookup function to search required value for a given hash key
dict = parsed [ComponentName]
IF rest.empty?
    return   dict
ELSE
    dict && lookUpComponent (dict, *rest)
END IF
END FUNCTION

FIG. 11

Execute Flow

```
FUNCTION ExecuteFlow()
1200 → IF selected project is existing THEN
            Instantiate the projectObj with the existing project file
            FOR EACH component in componentArray
                CALL downloadTemplateAndComponent(component[URL], isTemplate:false)
            END FOR
1202 → ELSE IF selected project is new THEN
            GOTO Project folder provided by user
            //Create new instance of the created project target
            CALL CreateProject( projectName,projectPath)
            CALL downloadTemplateAndComponent(Template[URL], isTemplate:true)
1204 →      //For each component in component Dictionary fetch the templates and component for new scenario
            FOR EACH component in componentDict
                CALL downloadTemplateAndComponent(component[URL], isTemplate: false)
            END FOR
       END IF
1206 → CALL CheckAndCreateTarget(targetType)
       CALL CheckAndCreateTarget(UT Target)
       CALL CheckAndCreateTarget(UITest Target)
       CALL CheckAndCreateDeploymentTargets()
       CALL Mapper

END FUNCTION
```

FIG. 12

Execute Flow – 
Create Project, Download Project Templates & Components

1300 → FUNCTION CreateProject (projectName,projectPath)

// Create Xcode project instance projectObject = Xcodeproj::Project.new( projectPath+ projectName +".xcodeproj")

END FUNCTION

1302 → FUNCTION downloadTemplateAndComponent(componentDict[],templateDict)

IF (isNewProject)

CALL RepositoryHandler(templateDict[url],isTemplate=true)

END IF

FOR component in ComponentDict[]

CALL RepositoryHandler(component[URL],isTemplate=false)

END FOR

END FUNCTION

FIG. 13

Execute Flow -
Create Project, Download Project Templates & Components

FUNCTION RepositoryHandler(url)

1400 → //define temporary folder path for components
tempFolder=ProjectPath+/Temp/

1402 → IF (isTemplate)
Fetch projectPath+URL  //download template to project path 1404 → ELSE
Fetch tempFolder+URL  //download components to temporary folder path

END IF

END FUNCTION

FIG. 14

Execute Flow - Check and Create Target Types

FUNCTION checkAndCreateTarget (TargetType)

1500 →
app_targetObj //iOS App target Object
watchOS app_targetObj // watchOS App target object
watchOS_extension_targetObj //watchOS extension target object
UT_targetObj //Unit test target Object
UITest_targetObj //UI test Target object
tvOS_app_targetObj //tvOS App target object
tvOS_app_targetObj //tvOS extension target objet Switch(targetType)

1502 →
Case iOS :        CALL createiOSAppTarget()
Case WatchOS +iOS :
                  CALL createWatchOSAppTarget()
Case tvOS :       CALL createtvOSAppTarget()
Case UT Target :
                  CALL createUTAppTarget()
Case UI Test Target :
                  CALL createUITestAppTarget()

END FUNCTION

FIG. 15

Execute Flow - Create Targets (iOS, watchOS, tvOS)

```
FUNCTION CreateiOSAppTarget()
    IF app_targetObj ==nil
        //Instantiate the targetObj with the project's target
1600→   app_targetObj = projectObj.new_target(:application, projectName, :ios, version) //example : versions =10.0 or 9.x etc
    END IF
END FUNCTION FUNCTION CreateWatchOSTarget( watchKitAppName, watchKitExtensionName)
    CALL CreateiOSAppTarget()
    IF watchos_app_targetObj ==nil
        //Instantiate the watchos_app_targetObj with the project's target
1602→   watchos_app_targetObj = projectObj.new_target(:watch2_app, "WatchOSWatchKitApp", :watchos, version') //example : versions =3.x etc
    END IF
    IF watchos_extension_targetObj ==nil
        //Instantiate the watchos_extension_targetObj with the project's target
1604→   watchos_extension_targetObj = projectObj.new_target(: watch2_extension, 'watchKitExtensionName', : watchos, version')
    END IF
END FUNCTION
```

FIG. 16A

Execute Flow - Create Targets (iOS, watchOS, tvOS)

FUNCTION CreatetvOSTarget(tv_app, tv_extension)

IF tvOS_app_targetObj ==nil

//Instantiate the tvos_app_targetObj with the project's target

1606 →   tvOS_app_targetObj = projectObj.new_target(:tv_app, "AppleTVOS", :appletvos, version)

END IF

IF tvOS_extension_targetObj ==nil

//Instantiate the tvos_extension_targetObj with the project's target

1608 →   tvOS_extension_targetObj = projectObj.new_target(:_tv_extension, "AppleTVOSExtension", :appletvos, version)

END IF

END FUNCTION

FIG. 16B

Mapper - Physical and logical mapping of the files

```
FUNCTION MapFiles()
    FOR component in ComponentList
        CALL DeclareVariables()
1700 →  targetObject = CALL fetchTargetObject() //Step 1: FetchTargetObject
        FileHandler.copy( folderPath, installationPath) //2 :Map files physically to the installation path
        destinationPath= InstallationPath +ComponentName
1702 →  FOR EACH item in destinationPath //Step 3 : Attach files logically to the installation path
            IF item prefix is UT or UI
                Case UT:
                    CALL addFilesToProject(item UTFolderPath, UT_targetObj)
                Case UI:
                    CALL addFilesToProject(item ,UITestFolderPath,UITest_targetObj )
            ELSE
                CALL addFilesToProject(item ,destinationPath, targetObject)
            END IF
        END FOR
```

FIG. 17A

Mapper - Physical and logical mapping of the files

IF (isCompilationFlagAvailable) // Step 4 : check if compiler flags need to be enabled 1704 → CALL addCompilationFlags(compilationFlags[])

END IF

IF ( isBridgingHeaderNeeded) //Step 5: Check if bridging header needed

1706 → CALL addBridgingHeader(bridgingHeaderImports[])

END IF

IF isInlineCodeNeeded //Step 6: Check if Inline code need to be added

1708 → CALL AddInlineCode(inlineCodePlaceholderfile)

END IF

END FOR // first loop running over componentList projectObj.saveProjectWorkSpace()

END FUNCTION

FIG. 17B

Mapper - Declare Variables for Mapping

1800 → FUNCTION DeclareVariables ()

1802 → targetType =component[targetType] //Fetch target Type

1804 → folderPath =component[folderPath] //Fetch folder path from downloaded component 1806 → installationPath=component[installationPath] //installation path w.r.t project folder isCompilationFlagAvailable=component[isCompilationFlagAvailable] //boolean to check if compilation flag need to be enabled compilationFlags[] =component[compilationFlags] //comma separated string values isBridgingHeaderNeeded=component[isBridgingHeaderNeeded] //boolean to check if bridging header needed bridgingHeaderImports=component[ bridgingHeaderImports] //bridging header imports , comma separated strings isInlineCodeNeeded =component[isInlineCodeNeeded] //boolean to check if inline code needed inlineCodePlaceholderfile=component[inlineCodePlaceholderfile] //placeholder file having predefined code to include UTFolderPath =component[UTFolderPath] //unit Test target project folder path UITestFolderPath =component[UITestFolderPath] //UITest target project folder path

END FUNCTION

FIG. 18

Mapper - Fetch Target Objects

1900 → FUNCTION Obj fetchTargetObject(targetType)

Switch(targetType)

1902 → Case iOS :

return app_targetObj //iOS App target Object

1904 → Case WatchOS_appKit:

return watchos_app_targetObj   // watchOS App target object

Case watchOS_extension:

return watchos_extension_targetObj //watchOS Extension target object

Case UT Target  :

return UT_targetObj //Unit test target Object

Case UI Test Target :

return UITest_targetObj //UITest target Object

END FUNCTION

FIG. 19

Mapper - Adding files logically to targets

2000 → FUNCTION addFilesToProject ( File,destinationPath, TargetObj)

//Adding files to the project and target

2002 → IF File is a directory THEN tempDir =create a new group with the name of File tempFile=File/* //fetch next set of files or folder CALL addfilesToProject (tempFile, tempDir , TargetObj)

2004 → ELSE

FOR EACH item in DestinationPath

Create reference of Swift files and add to the TargetObj

END FOR

END IF

END FUNCTION

FIG. 20

Mapper - Adding Compilation Flags

2100 → FUNCTION addCompilationFlag(compilationFlags[])

FOR EACH config in Targets //for each configuration in targets

FOR EACH settings in CompilationFlags //Iterate over compilation flag array

// Set the debugger flags and the build settings to the intended target

FOR key in settings

2102 →                 config.build_settings[key'] = settings [key] //Read keys and assign to the config build settings

END FOR

END FOR

END FOR

End FUNCTION

FIG. 21

Mapper - Adding Bridging Header

2200 → FUNCTION addBridgingHeader(bridgingHeaderImports[])

bridgingHeadeFile= projectName+-Bridging-Header.h

2202 → IF !(bridgingHeadeFile) //Check if bridging header file exists create File bridgingHeaderFile

END IF

Open file

2204 → FOR EACH item in bridgingHeaderImports //Iterate over BridgingHeaderImports array to fetch the import details append Item in bridgingHeaderFile

END FUNCTION

FIG. 22

Mapper - Adding Inline code

2300 → FUNCTION AddInlineCode(InlineCodePlaceHolderfile, destinationFile)

//Read content from placeholder file
2302 → inlineContent = Read InlineCodePlaceHolderFile //destination file handler where content need to be placed
destFileHandler = Open(destinationFile)
destFileContent = Read(destFileHandler)

//Find and Replace Content
2304 → codeline = ParseContent(destFileContent ,destKey)
ReplaceCode(codeline , inlineContent )
save(origFileHandler)

END FUNCTION

FIG. 23

Dependency Manager – Create/Update Dependency

2400 → FUNCTION AddDependency()

//Function to iterate over dependencyList and create/update file to run the dependency manager FOR EACH ITEM in listofDependency name=ITEM[name]

url= ITEM[url]

version=ITEM[version]

IF !(DependencyFile.exist)

create dependencyFile

END IF append name +url + version

END FOR

FIG. 24A

Dependency Manager - Run Dependency

//Config settings //Enable settings for pods
DependencyDataArray = CALL generateComponentList(listofDependency)
//Iterate over Dependency Data Array
2402 → FOR EACH item in DependencyDataArray
    isCompilationFlagAvailable= item [isCompilationFlagAvailable] //boolean to check if compilation flag need to be enabled
    compilationFlags[] = item [compilationFlags] //comma separated string values
    IF (isCompilationFlagAvailable)
        CALL addCompilationFlags(compilationFlags[])
    END IF
FOR END
Switch (dependencyType)
2404 → Case POD:
    Run POD_dependencyManager
Case Carthage:
    Run Carthage_dependencyManager

END FUNCTION

FIG. 24B

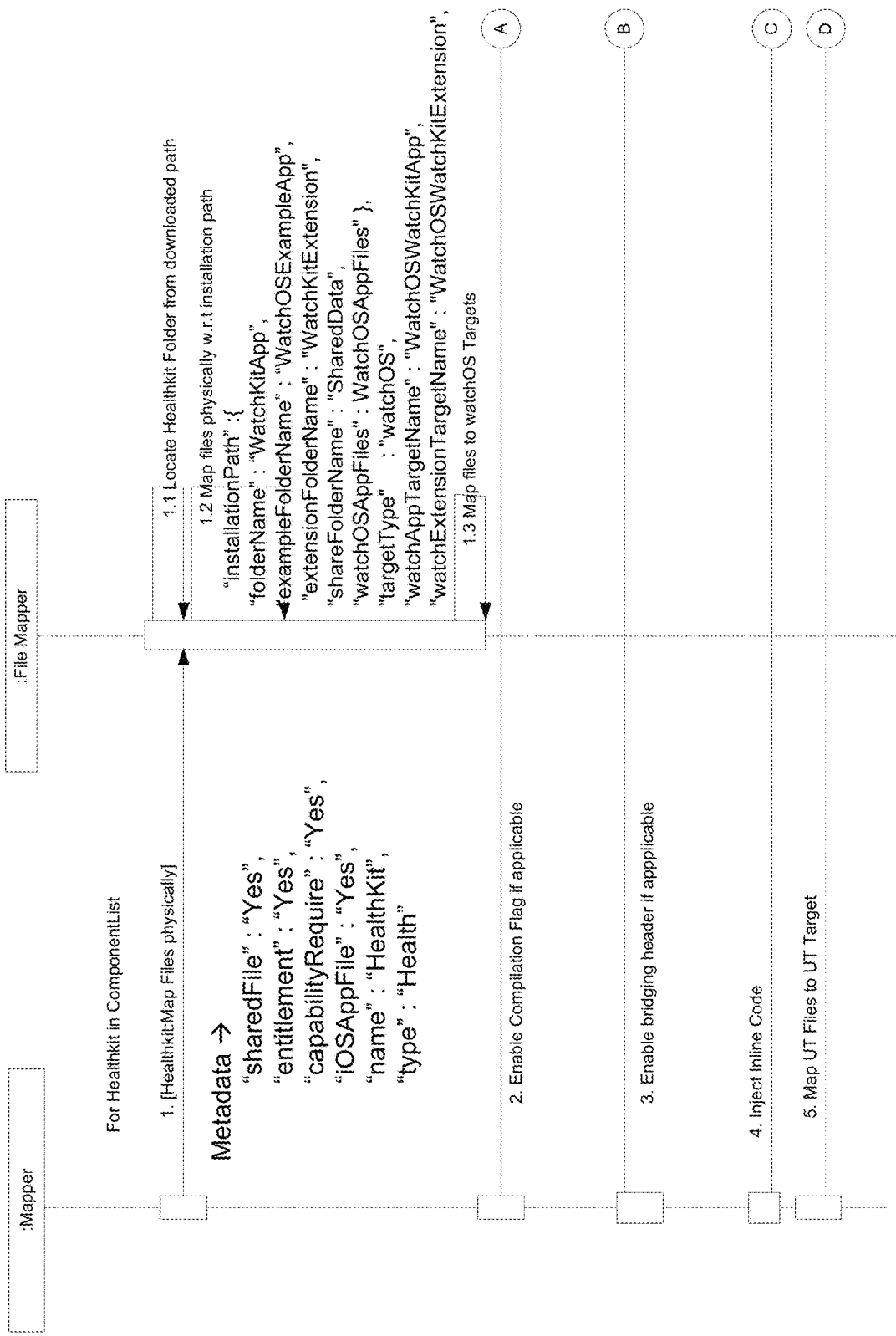

2700

ASCERTAIN, FOR A PROJECT, AN INPUT THAT INCLUDES PROJECT INFORMATION, COMPONENT INFORMATION, AND TARGET INFORMATION
2702

PARSE THE PROJECT INFORMATION TO DETERMINE WHETHER THE PROJECT IS AN EXISTING PROJECT OR A NEW PROJECT
2704

GENERATE A COMPONENT LIST FROM THE COMPONENT INFORMATION
2706

ASCERTAIN COMPONENTS FROM THE COMPONENT LIST
2708

MAP EACH OF THE ASCERTAINED COMPONENTS TO A CORRESPONDING TARGET DETERMINED FROM THE TARGET INFORMATION BY ATTACHING, BASED ON AN INSTALLATION PATH, A FILE ASSOCIATED WITH AN ASCERTAINED COMPONENT TO THE CORRESPONDING TARGET
2710

ANALYZE A DEPENDENCY FOR EACH OF THE RETRIEVED COMPONENTS RELATIVE TO AT LEAST ONE OTHER COMPONENT OF THE RETRIEVED COMPONENTS
2712

GENERATE BASED ON THE MAPPING AND THE ANALYZED DEPENDENCY, AN INTEGRATED OUTPUT THAT INCLUDES AN ARCHITECTURE FOR AN APPLICATION ASSOCIATED WITH THE PROJECT
2714

FIG. 27

APPLICATION ARCHITECTURE GENERATION

PRIORITY

The present application claims priority under 35 U.S.C. 119(a)-(d) to Indian patent application number 201711027327, having a filing date of Aug. 1, 2017, the disclosure of which is hereby incorporated by reference in its entirety.

BACKGROUND

An application may be described as a computer program that is designed to perform a specified task, or a group of coordinated functions. Applications may include, for example, a web browser, a console game, an image editor, a word processor, etc. An application may be downloaded or otherwise accessed by a computerized device, such as, a personal computer, a tablet, a smartphone, a watch, etc.

BRIEF DESCRIPTION OF DRAWINGS

Features of the present disclosure are illustrated by way of example and not limited in the following figure(s), in which like numerals indicate like elements, in which:

FIG. 10 illustrates parse arguments with respect to application architecture generation in accordance with an example of the present disclosure;

FIG. 11 illustrates component list generation with respect to application architecture generation in accordance with an example of the present disclosure;

FIG. 12 illustrates flow execution with respect to application architecture generation in accordance with an example of the present disclosure;

FIG. 13 illustrates project creation, and downloading of project templates and components with respect to application architecture generation in accordance with an example of the present disclosure;

FIG. 14 illustrates project creation, and downloading of project templates and components with respect to application architecture generation in accordance with an example of the present disclosure;

FIG. 15 illustrates checking and creation of target types with respect to application architecture generation in accordance with an example of the present disclosure;

FIGS. 16A and 16B illustrate target creation with respect to application architecture generation in accordance with an example of the present disclosure;

FIGS. 17A and 17B illustrate physical and logical mapping of files with respect to application architecture generation in accordance with an example of the present disclosure;

FIG. 18 illustrates variable declaration for mapping with respect to application architecture generation in accordance with an example of the present disclosure;

FIG. 19 illustrates fetching of target objects with respect to application architecture generation in accordance with an example of the present disclosure;

FIG. 20 illustrates logical adding of files to targets with respect to application architecture generation in accordance with an example of the present disclosure;

FIG. 21 illustrates adding of compilation flags with respect to application architecture generation in accordance with an example of the present disclosure;

FIG. 22 illustrates adding of a bridging header with respect to application architecture generation in accordance with an example of the present disclosure;

FIG. 23 illustrates adding of inline code with respect to application architecture generation in accordance with an example of the present disclosure;

FIG. 24A illustrates creation and update of dependencies with respect to application architecture generation in accordance with an example of the present disclosure;

FIG. 24B illustrates dependency execution with respect to application architecture generation in accordance with an example of the present disclosure;

FIG. 27 illustrates a flowchart of an example method for application architecture generation in accordance with an example of the present disclosure.

DETAILED DESCRIPTION

Figure 1:
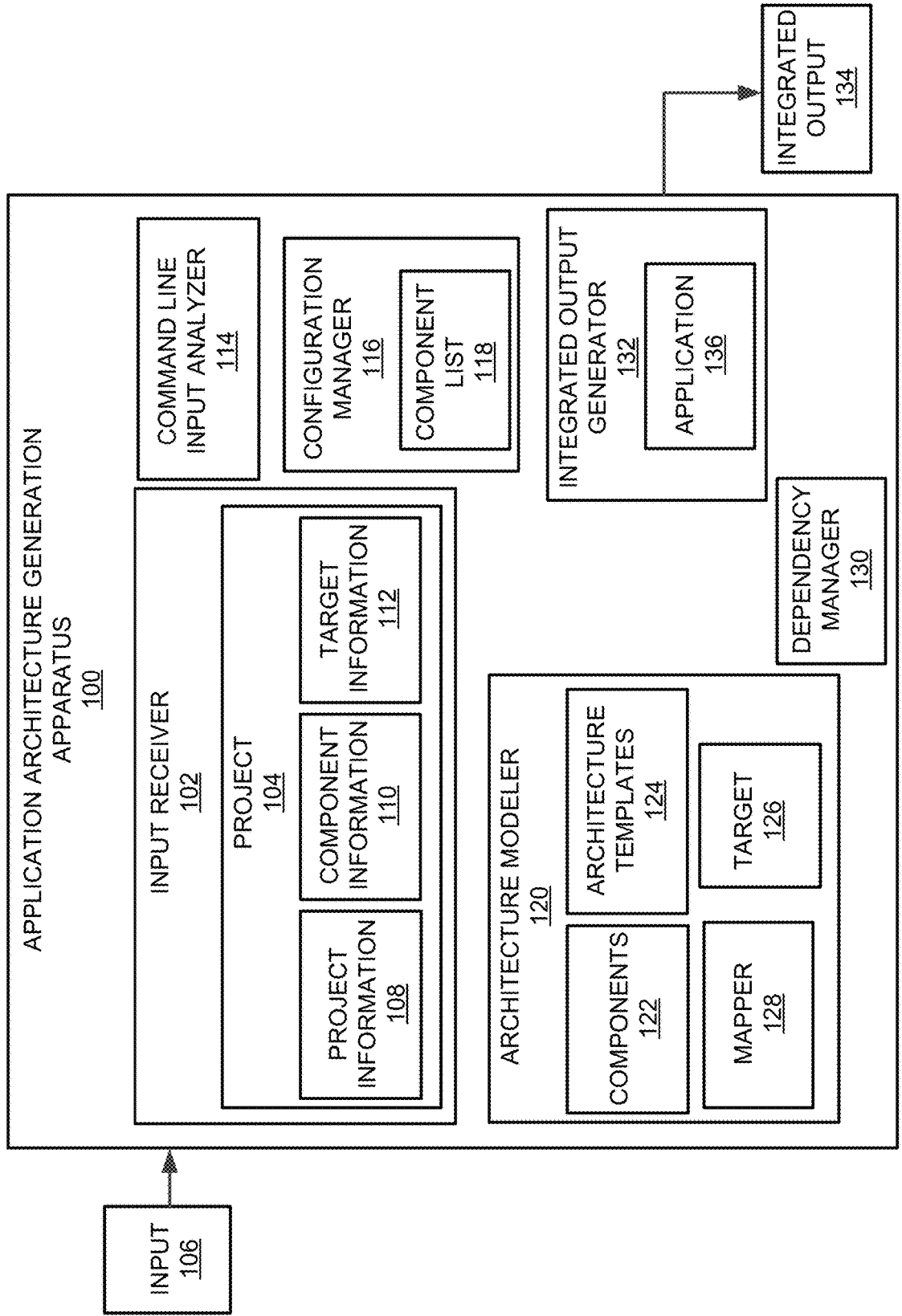
FIG. 1 illustrates a layout of an application architecture generation apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Application architecture generation apparatuses, methods for application architecture generation, and non-transitory computer readable media having stored thereon machine readable instructions to provide application architecture generation are disclosed herein. The apparatuses, methods, and non-transitory computer readable media disclosed herein provide for application architecture generation by ascertaining, for a project, an input that includes project information, component information, and target information, and parsing the project information to determine whether the project is an existing project or a new project. A component may be described as a file that performs a specified task (e.g., displaying a chart, providing a digital display of a heart rate, etc.). A target may be described as a device (e.g., a watch, a mobile phone, a television, etc.) and/or an operating system associated with a device. Application architecture generation may further include generating a component list from the component information, ascertaining components from the component list, and mapping each of the ascertained components to a corresponding target determined from the target information. Further, application architecture generation may include analyzing a dependency for each of the ascertained components relative to at least one other component of the ascertained components, and generating, based on the mapping and the analyzed dependency, an integrated output that includes an architecture for an application associated with the project.

With respect to application generation for mobile platforms, developers may encounter a variety of technical challenges. For example, developers may encounter technical challenges with respect to redundant efforts to setup a project in the inception phase, and lack of efficient and automated code generation and integration. Developers may also encounter technical challenges with respect to automated creation of a customized base project structure. In this regard, each project may adopt its own structure, without any standardization. Developers may also encounter technical challenges with respect to adherence to organizational copyright and avoidance of code vulnerability issues. Developers may further encounter technical challenges with respect to integration of reusable components from various sources, and a curated and approved set of third party binaries and/or libraries being made available for a specific project. Other technical challenges may include the lack of availability of a single master component and/or reusable code repository, and backward compatibility issues due to custom assets management due to specification upgrade. Yet further, technical challenges may include the unavailability of a cloud based mechanism to manage custom assets, the unavailability of a pre-integrated toolkit for static code analysis, the lack of inline code generation when components are integrated, and the lack of an environment pre-startup kit and deployment guide.

In order to addresses at least the aforementioned technical challenges, the apparatuses, methods, and non-transitory computer readable media disclosed herein provide a SWIFT™ solution to facilitate acceleration of the development and maintenance of projects, such as, architecture generation for an application. SWIFT™ may be described as a general-purpose, multi-paradigm, compiled programming language developed by APPLE™ for IOS™, MACOS™, WATCHOS™, TVOS™, and LINUX™. The apparatuses, methods, and non-transitory computer readable media disclosed herein also provide for reduction in efforts needed to develop and/or enhance base implementations of applications, and integration of various third party and internal assets in such applications. The apparatuses, methods, and non-transitory computer readable media disclosed herein further provide for set up of various architecture patterns, architecture templates code, reduction of design efforts, and standardization of architecture framework and reference implementations with respect to applications. Yet further, the apparatuses, methods, and non-transitory computer readable media disclosed herein provide for implementation of a common interface to perform various tasks across software development phases for an application, and implementation of one-click integration for static code coverage and/or analysis, and reporting.

The apparatuses, methods, and non-transitory computer readable media disclosed herein provide for generation of an intended workspace at run time to integrate base templates for an application, and practical open development (POD) structures and/or components, downloading and integration of architecture templates, and reference implementation for standard third party and custom composition. In this regard, a template may be described as a base framework for an application, and a structure for the application with respect to source code.

The apparatuses, methods, and non-transitory computer readable media disclosed herein also provide for automated deployment support, increased productivity by re-using code associated with templates, and integration of a suite by downloading PODs.

With respect to code coverage, the apparatuses, methods, and non-transitory computer readable media disclosed herein provide a pre-integrated suite of external tools to perform code coverage.

With respect to static analysis, the apparatuses, methods, and non-transitory computer readable media disclosed herein provide a pre-integrated suite of external tools to perform static code analysis.

With respect to test automation, the apparatuses, methods, and non-transitory computer readable media disclosed herein provide for mocking of test implementation and performance of framework integration.

With respect to access to internal and/or private components, the apparatuses, methods, and non-transitory computer readable media disclosed herein provide an integrated toolset to access internal and/or private components, and run time fetching via a dependency manager.

With respect to access to uniformity enforcement, the apparatuses, methods, and non-transitory computer readable media disclosed herein provide for uniformity and standardization across projects.

With respect to best practices and guidelines, the apparatuses, methods, and non-transitory computer readable media disclosed herein provide for generation and sharing of best practices, guidelines, and checklist.

With respect to integration of multiple components at run time, the apparatuses, methods, and non-transitory computer readable media disclosed herein provide for selection of multiple internal and/or third party components at run time.

With respect to interfacing with an organization specific centralized repository, the apparatuses, methods, and non-transitory computer readable media disclosed herein provide a common location to submit and/or upload internal assets.

With respect to access to third party components, the apparatuses, methods, and non-transitory computer readable media disclosed herein provide a suite to access third party components using a dependency manager.

The apparatuses, methods, and non-transitory computer readable media disclosed herein may be applied to a variety of technologies. For example, with respect to healthcare monitoring, the apparatuses, methods, and non-transitory computer readable media disclosed herein may provide for generation of a mobile application for mobile devices, such as for IOS™ based mobile devices, watches, televisions, etc. In this regard, the apparatuses, methods, and non-transitory computer readable media disclosed herein may provide for generation of a framework and source code for an application. An example of an application may include a healthcare application. The healthcare application may include a use-case that includes tracking of a user's steps to monitor the user's health. In order to build the application, a base project may be created so that the use-case (e.g., healthcare specific use-case) may be built on top of the framework for the application. In this regard, a development environment for the application may include, for example, Xcode, which represents a development environment that may be used to build the application. In order to generate the framework and source code for the application, a template may be selected, where the template provides a closest match to application specifications. The application may include an architecture pattern (e.g., defining of folder structures, levels of hierarchy for code, modularization of code, etc.). After these aspects are set-up, user interfaces may be built, for example, by using components as disclosed herein. Further, the apparatuses, methods, and non-transitory computer readable media disclosed herein may provide for integration of the components, etc., as disclosed herein with a specified device. If a component already exists that is to be reused, such a component may be identified and imported in a working environment. Further, the component may be integrated within environment, and further operations may be performed on the component.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example application architecture generation apparatus (hereinafter also referred to as "apparatus 100").

Referring to FIG. 1, the apparatus 100 may include an input receiver 102 that is executed by at least one hardware processor (e.g., the hardware processor 2602 of FIG. 26, and/or the hardware processor 2804 of FIG. 28) to ascertain, for a project 104, an input 106 that includes project information 108, component information 110, and target information 112.

A command line input analyzer 114 that is executed by the at least one hardware processor is to parse the project information 108 to determine whether the project 104 is an existing project or a new project.

A configuration manager 116 that is executed by the at least one hardware processor is to generate a component list 118 from the component information 110.

An architecture modeler 120 that is executed by the at least one hardware processor is to ascertain components 122 from the component list 118. According to an example, in response to a determination that the project is an existing project, the architecture modeler 120 is executed by the at least one hardware processor to ascertain (e.g., by downloading) the components 122 from the component list 118, and for each of the ascertained components 122, generate a corresponding target 126 determined from the target information 112. According to another example, in response to a determination that the project is the new project, the architecture modeler 120 is executed by the at least one hardware processor to ascertain the components 122 from the component list 118 and architecture templates 124 associated with the project 104, and for each of the ascertained components 122, generate the corresponding target 126 determined from the target information 112. According to an example, the target may include a phone, a tablet, a watch, a television, etc.

A mapper 128 that is executed by the at least one hardware processor is to map each of the ascertained components 122 to a corresponding target 126 determined from the target information 112.

According to an example, the mapper 128 may be executed by the at least one hardware processor to map each of the ascertained components 122 to the corresponding target 126 determined from the target information 112 by declaring variables for the mapping, determining target objects from the target information 112, and adding, based on the declared variables and the determined target objects, the ascertained components 122 to the corresponding target 126 determined from the target information 112.

According to an example, the mapper 128 may be executed by the at least one hardware processor to map each of the ascertained components 122 to the corresponding target 126 determined from the target information 112 by attaching, based on an installation path, a file associated with an ascertained component to the corresponding target 126.

According to an example, the mapper 128 may be executed by the at least one hardware processor to map each of the ascertained components 122 to the corresponding target 126 determined from the target information 112 by enabling a debugger flag with respect to the corresponding target 126.

According to an example, the mapper 128 may be executed by the at least one hardware processor to map each of the ascertained components 122 to the corresponding target 126 determined from the target information 112 by adding inline code with respect to the corresponding target 126.

According to an example, the mapper 128 may be executed by the at least one hardware processor to map each of the ascertained components 122 to the corresponding target 126 determined from the target information 112 by adding a bridging header with respect to the corresponding target 126.

A dependency manager 130 that is executed by the at least one hardware processor is to analyze a dependency for each of the ascertained components 122 relative to at least one other component of the ascertained components 122. In this regard, the dependency manager 130 may create or update a dependency based on the dependency analysis.

An integrated output generator 132 that is executed by the at least one hardware processor is to generate, based on the mapping and the analyzed dependency, an integrated output 134 that includes an architecture for an application 136 associated with the project 104. Alternatively, the integrated output generator 132 may be included as a component of the architecture modeler 120, where the architecture modeler 120 may be specified as an architecture modeler and integrated output generator 132.

Figure 2:
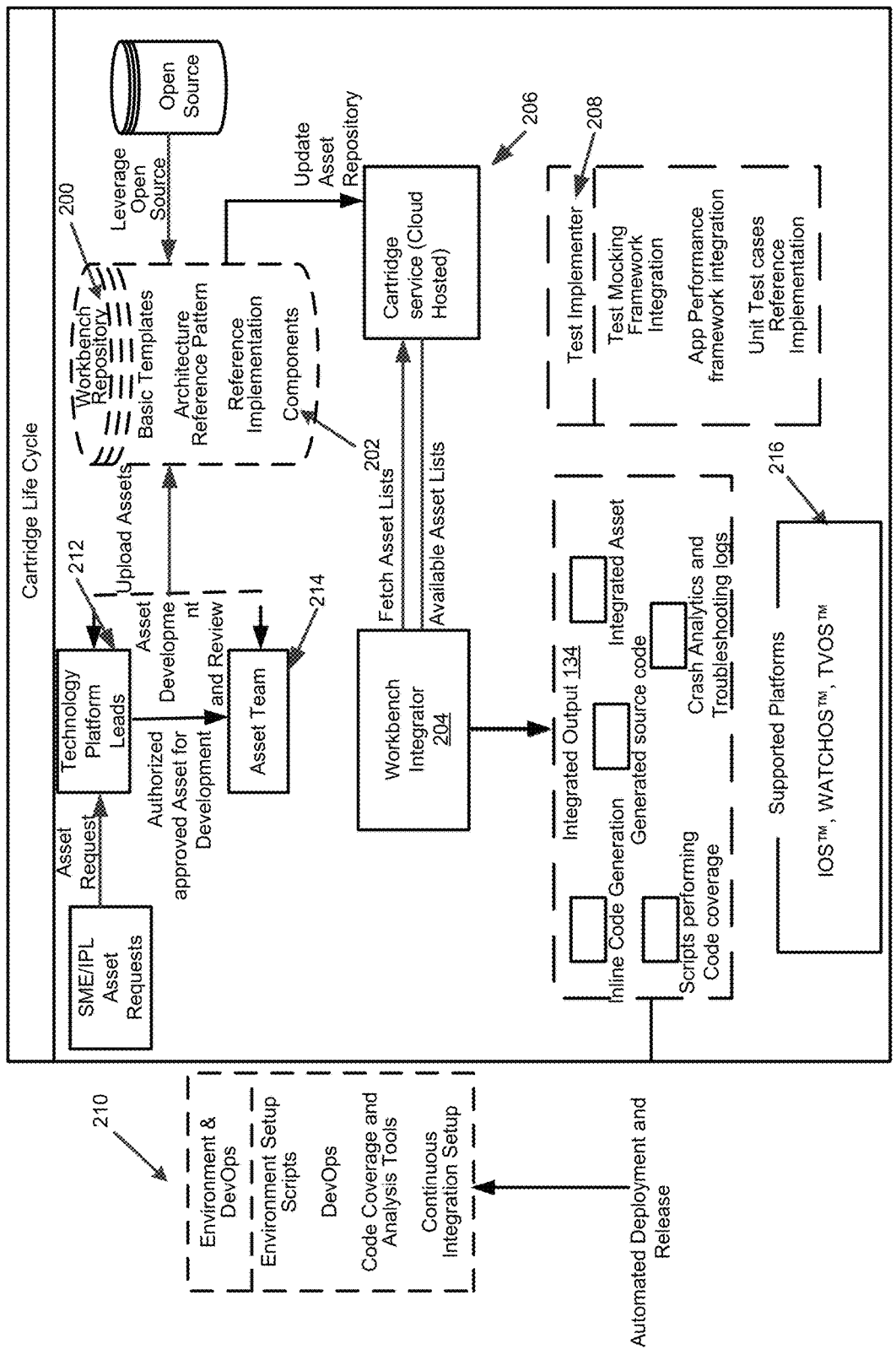
FIG. 2 illustrates further details of a system that includes the application architecture generation apparatus of FIG. 1 in accordance with an example of the present disclosure.

FIG. 2 illustrates further details of a system that includes the application architecture generation apparatus of FIG. 1 in accordance with an example of the present disclosure.

Referring to FIG. 2, a workbench repository 200 may store a list 202 of approved custom components 122 and/or assets. For example, the workbench repository 200 may store base architecture templates 124, architecture reference patterns, reference implementations, and the components 122. The workbench repository 200 may further store references to other open source assets through private practical open development (POD) or source code.

A workbench integrator 204 may include the apparatus 100 to integrate various elements, including the components 122. In this regard, the workbench integrator 204 may provide options for performing tasks such as project workspace creation, component integration, boiler plate code generation, inline code generation, integration for quality compliance, and deployment. The workbench integrator 204 may operate in conjunction with a cartridge service (cloud hosted) 206 to provide an interface to an end user (e.g., developers) to fetch intended components 122 and/or assets from the workbench repository 200. The workbench integrator 204 (which includes the apparatus 100 as described in FIG. 3) may generate the integrated output 134 including, from the workbench repository 200, an intended reference architecture pattern, base templates along with selected components 122, and reference implementations. The integrated output 134 may include inline code generation, generated source code, integrated assets, scripts for performing code coverage, and crash analytics and troubleshooting logs.

The cartridge service (cloud hosted) 206 may host a list of approved assets and/or components 122 that may be fetched. In this regard, the cartridge service (cloud hosted) 206 may host the list of approved assets and/or the components 122 that may be used by the apparatus 100. For example, the assets and/or the components 122 may be fetched via a REST application programming interface (API). Further, the cartridge service (cloud hosted) 206 may provide for update through notification services.

A test implementer 208 may provide for testing with respect to the integrated output 134 generated for the application 136. Further, the test implementer 208 may provide reference test case patterns along with application performance framework integration to facilitate quality management. The test implementer 208 may provide for test mocking framework integration, application performance framework integration, and unit test cases reference implementation.

DevOps may represent software development and information technology operations, where DevOps may refer to a set of practices that emphasize the collaboration and communication of both software developers and information technology (IT) professionals while automating the process of software delivery. In this regard, the environment setup and DevOps 210 may provide for the initialization and setup of the environment to use the apparatus 100 by enabling various scripts needed to support initial tool setup, deployment, and release. Thus, the environment setup and DevOps 210 may provide for environment setup scripts, DevOps, code coverage and analysis tools, and continuous integration setup.

With respect to technology platform leads 212 (e.g., developers, architects, etc.), the technology platform leads 212 may include a group of subject matter experts (SMEs) that design base architecture patterns and approve the component request being made with respect to the application 136 associated with the project 104. The architecture patterns and approved component requests may be analyzed, for example, by an asset team 214, for further development and review. The technology platform leads 212 may also include responsibility for reviewing the architecture patterns and approved component requests before the architecture patterns and approved component requests are pushed to the workbench repository 200.

The asset team 214 may provide for the building of a requested asset (e.g., tools and/or information associated with the project 104). In this regard, the asset team 214 may seek formal review and approval before the requested asset is uploaded to the workbench repository 200. The asset team 214 may include a group of individuals that build the components 122 using, for example, a crowd source based approach.

For the apparatus 100, various platforms may be supported as shown, for example, at 216. For the example of FIG. 2 (as well as FIGS. 4-25), the platforms may include IOS™, WATCHOS™, TVOS™, etc. However, it will be appreciated in view of this disclosure that other platforms may be supported. The IOS™ WATCHOS™, TVOS™, etc., platforms are described solely for facilitating an explanation of the apparatus 100, and for providing related examples.

Figure 3:
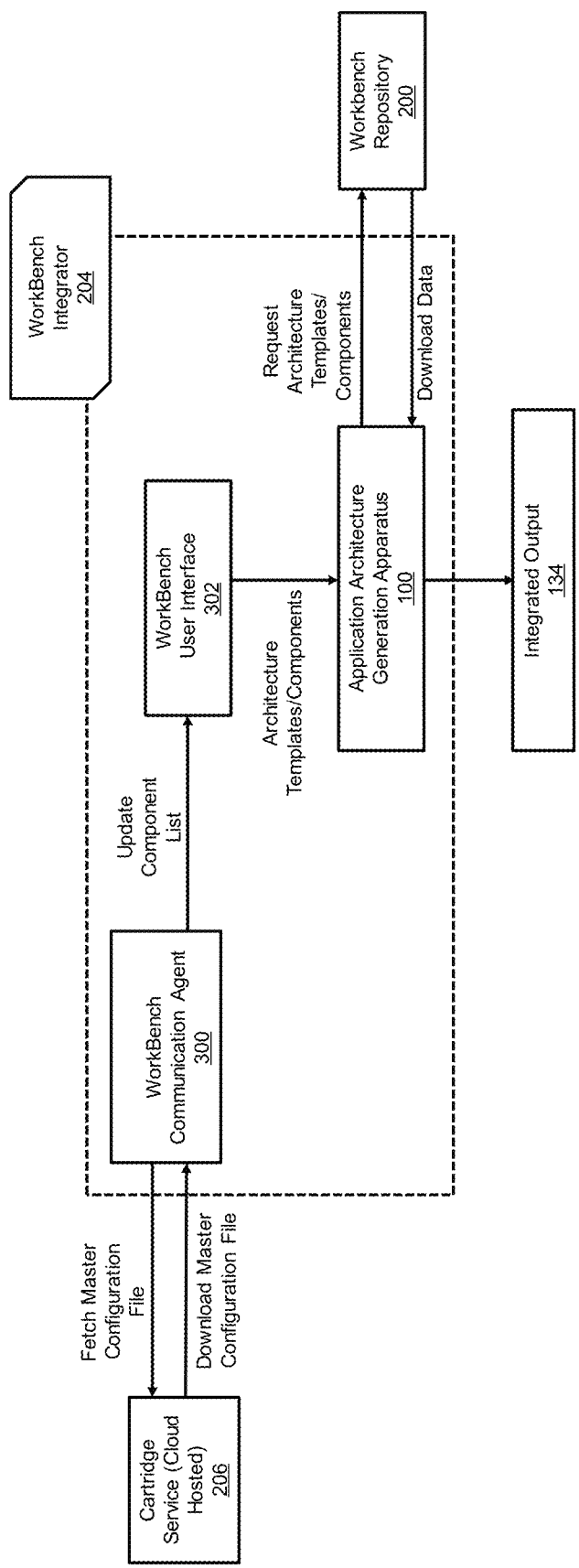
FIG. 3 illustrates a flow diagram associated with the system of FIG. 2 including the application architecture generation apparatus of FIG. 1 in accordance with an example of the present disclosure.

FIG. 3 illustrates a flow diagram associated with the system of FIG. 2 including the application architecture generation apparatus of FIG. 1 in accordance with an example of the present disclosure.

Referring to FIG. 3, a workbench communication agent 300 may provide an interface between the cartridge service (cloud hosted) 206 and the apparatus 100. The workbench communication agent 300 may also provide for the implementation of connections between the cartridge service (cloud hosted) 206 and the apparatus 100, and the handling of response data. The workbench communication agent 300 may send a request to the cartridge service (cloud hosted) 206 to fetch a master configuration file (described in further detail with reference to FIG. 4), and in response, download the master configuration file from the cartridge service (cloud hosted) 206.

A workbench user interface 302 may display or generate a display list of components 122 and base templates to be included to create and/or update a project workspace. The apparatus 100 may provide, in conjunction with the cartridge service (cloud hosted) 206, the needed interface, for example, to end user (developers) to fetch intended components 122 and/or assets from the workbench repository 200. The workbench user interface 302 may receive an updated component list 118 from the workbench communication agent 300. Further, the workbench user interface 302 may forward, to the apparatus 100, the architecture templates 124 (e.g., a list of architecture templates) and/or the components 122 (e.g., a list of architecture components).

The apparatus 100 may include the elements to model reference architecture and design patterns. The apparatus 100 may integrate and map the intended components 122. The apparatus 100 may provide the needed intelligence for project workspace creation, component integration, boiler plate code generation, inline code generation, and integration for quality compliance. The apparatus 100 may request, from the workbench repository 200, the architecture templates 124 and/or the components 122. Further, the apparatus 100 may download data related to the requested architecture templates 124 and/or the components 122 from the workbench repository 200.

Figure 4:
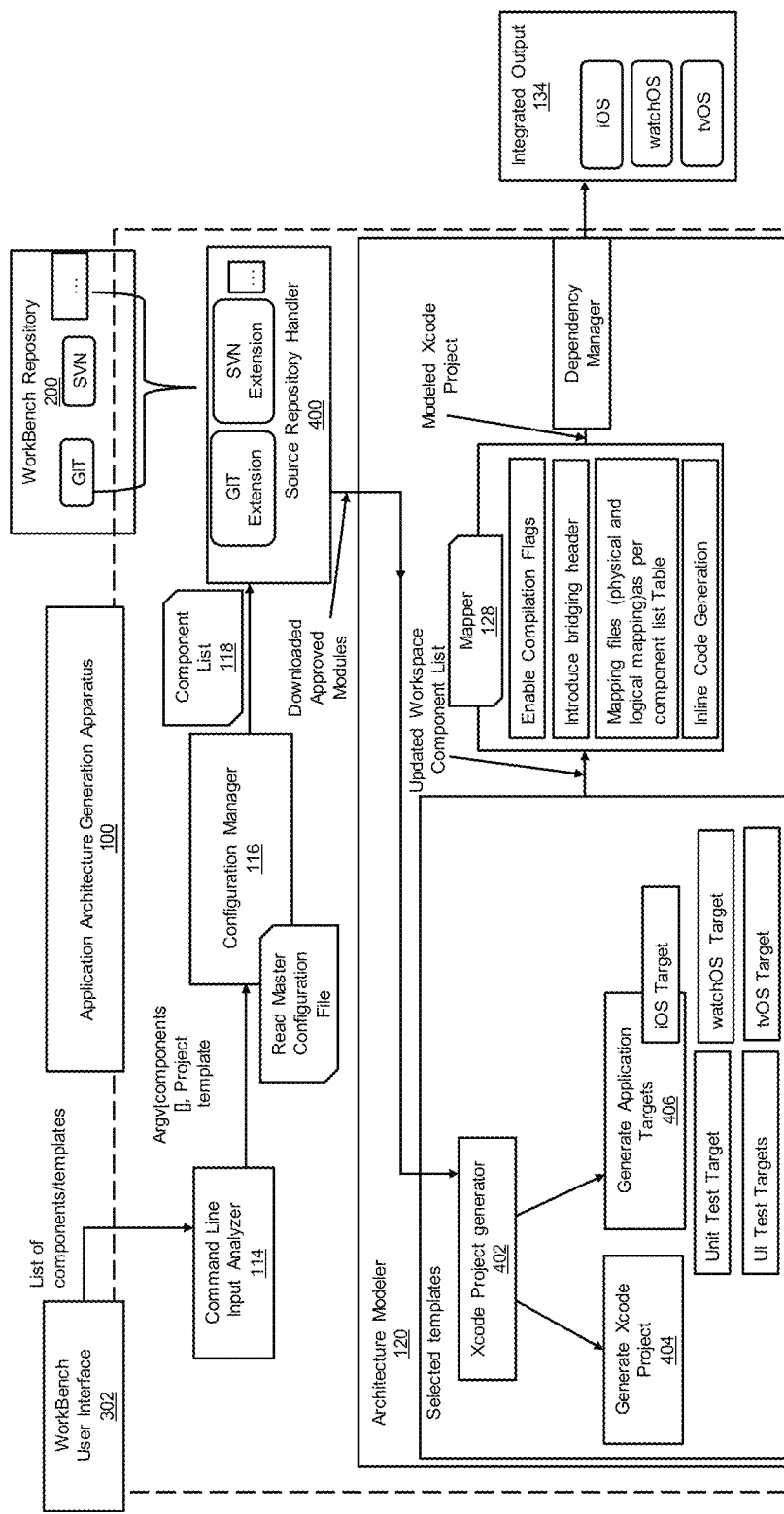
FIG. 4 illustrates further details of elements of the application architecture generation apparatus of FIG. 1 in accordance with an example of the present disclosure.

FIG. 4 illustrates further details of elements of the application architecture generation apparatus of FIG. 1 in accordance with an example of the present disclosure.

Referring to FIG. 4, the apparatus 100 may include the command line input analyzer 114 to receive the input 106 from the input receiver 102. The input 106 may include, for example, a list of the components 122 (e.g., included in the component information), dependencies, the template information, and other metadata such as execution flow, and the project information 108 such as project path, project name, etc. The command line input analyzer 114 may generate arguments from the input 106 received from the input receiver 102. The command line input analyzer 114 may generate a master configuration file.

The configuration manager 116 may read and parse the master configuration file to provide a list of available components 122 (e.g., the component list 118) and base templates. The configuration manager 116 may also generate a list of Uniform Resource Locators (URL) and metadata (e.g., installation path, version, GIT URLs, and other metadata) for the selected component, templates, and/or dependencies.

A source repository handler 400 may initiate the pull operation from a relevant repository for a given set of components and/or template URLs. For example, the source repository handler 400 may initiate the pull operation from the workbench repository 200 for a given set of components and/or template URLs. In this regard, the source repository handler 400 may utilize the URLs and components metadata to download approved modules for the components 122.

The architecture modeler 120 may create a base project and intended targets as per the component list 118. The architecture modeler 120 may receive downloaded approved modules (e.g., for the components 122) from the source repository handler 400. The architecture modeler 120 may trigger the mapper 128 to map component and/or template files. In this regard, the mapper 128 may map component and/or template files per an installation path identified in a configuration file. Further, the mapper 128 may enable compilation flags, introduce bridging headers, map files per the component list 118, and implement inline code generation. The configuration manager 116 may read a master configuration file that is included in the configuration file.

An Xcode project generator 402 may generate a base project for a new project 104. Further, the Xcode project generator 402 may generate intended targets as per the component list 118.

With respect to generation of an Xcode project at 404, generation of the Xcode project may include generation of the base project for a new project with a given project name at an intended project path.

With respect to generation of an application target at 406, generation of an application target may include creation, for example, of N targets based on the components selected, including a mandatory target such as base project target, unit test (UT), and user interface (UI) test targets. Thus, examples of targets may include test targets such as a UT target, a UI target, and platform targets such an IOS™ target, a WATCHOS™ target, a TVOS™ target, and other such targets.

The mapper 128 may map and attach files physically and logically to the project targets for the given set of components 122 and/or templates. The mapper 128 may also enable metadata properties to the intended targets. The mapper 128 may enable compilation flags, introduce a bridging header, map files as per the component list 118, and implement inline code generation.

The modelled Xcode project may represent an updated workspace including a defined set of targets and associated mapping performed as per the installation path.

The dependency manager may download dependencies (e.g., third party component or private components) along with workspace creation via an intended interface. Examples of interfaces may include CARTHAGE™ or COCOAPOD™

Figure 5A:
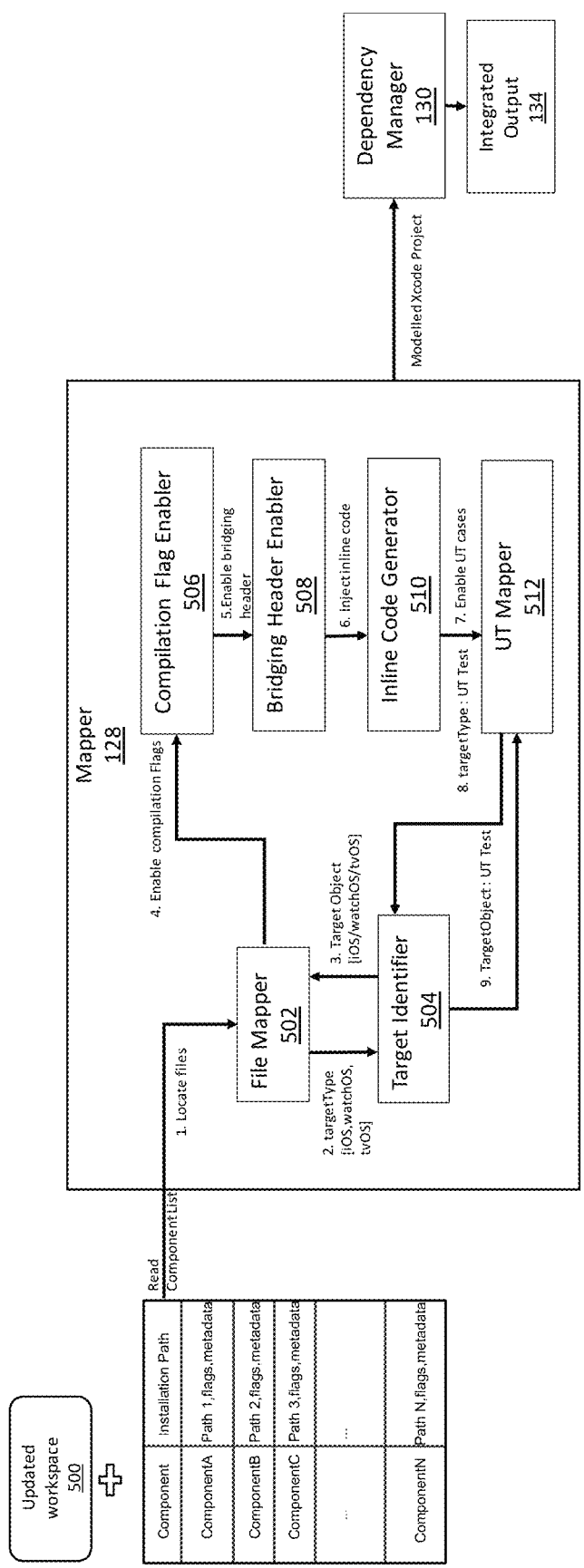
FIG. 5A illustrates further details of a mapper from the elements of FIG. 4 in accordance with an example of the present disclosure.

FIG. 5A illustrates further details of the mapper 128 from the elements of FIG. 4 in accordance with an example of the present disclosure.

For the example of FIG. 5A, the selected components 122 may include a Component-A including an installation path that includes Path-1, flags, and metadata, a Component-B including an installation path that includes Path-2, flags, and metadata, etc. The installation path may represent where a component resides. Component-A may represent, for example, a networking component.

Referring to FIG. 5A, the mapper 128 may receive as input an updated workspace file for Xcode and the component list. The mapper 128 may map files/components physically and logically to the intended targets based on the installation path used in configuration file. The mapper 128 may iterate over the component list to fetch component name, installation path, and other metadata to enable properties to the project created. Once the components are located from the downloaded path, the files may be mapped physically to the installation path of the project. The mapper 128 may also map files logically to the intended project target based on the target type mentioned as per metadata input. Further the mapper 128 may read the compiler flag properties to be enabled for the component integrated along with enabling bridging header and injecting inline code. The mapper 128 may also map relevant UT test cases for the component under iteration. Once all components/templates are mapped, the mapper 128 may update the workspace, and execution proceeds to the dependency manager 130 to install dependency files. The updated workspace 500 may include the updated Xcode workspace and necessary target to map the files to.

A file mapper 502 may map files physically and logically to the intended targets. In this regard, the file mapper 502 may read the component list 118, locate downloaded components 122, and map folder and files physically to an installation path. Further, the file mapper 502 may attach files to a target, and add reference implementation.

A target identifier 504 may identify and fetch a relevant targetObject to attach the files. In this regard, the target identifier 504 may identify the target type (e.g., IOS™, WATCHOS™, TVOS™, etc.). Further, the target identifier 504 may filter files for targets.

A compilation flag enabler 506 may identify and enable the needed compilation flag to the project build setting. In this regard, the compilation flag enabler 506 may read the component list 118 and identify a component. Further, the compilation flag enabler 506 may enable flags based on a component. The compilation flag enabler 506 may also define a release and/or debug mode with respect to a component.

A bridging header 508 may create and/or update a bridging header file to support, for example, objective-C code in the target code. The bridging header 508 may be described as a SWIFT™ bridging header that allows for communication with objective-C classes from SWIFT™ classes. Further, the bridging header 508 may import relevant bridging header files for the intended component based on the metadata. In this regard, the bridging header 508 may read the component list 118, identify the component, and enable the bridging header.

An inline code generator 510 may insert the needed set of boiler plate code to the intended file. In this regard, the inline code generator 510 may read the component list 118, identify the component, read the predefined set of instructions, and add inline code. The inline code may include, for example, code for push notification, etc.

A unit test (UT) mapper 512 may map unit test and user interface test files to the respective targets (UT test targets and UI test targets). In this regard, the unit test mapper 512 may read the component list 118, identify the component, and map files to UT/UI test target. In this regard, the code generated by the mapper 128 may be tested by the unit test mapper 512.

The dependency manager 130 may download the dependencies (e.g., third party component or private components) along with workspace creation via an intended interface. Examples of an intended interface may include CARTHAGE™ or COCOAPOD™. In this regard, the dependency manager 130 may read dependency data, create and/or update the dependency file, and install a dependent component.

Figure 5B:
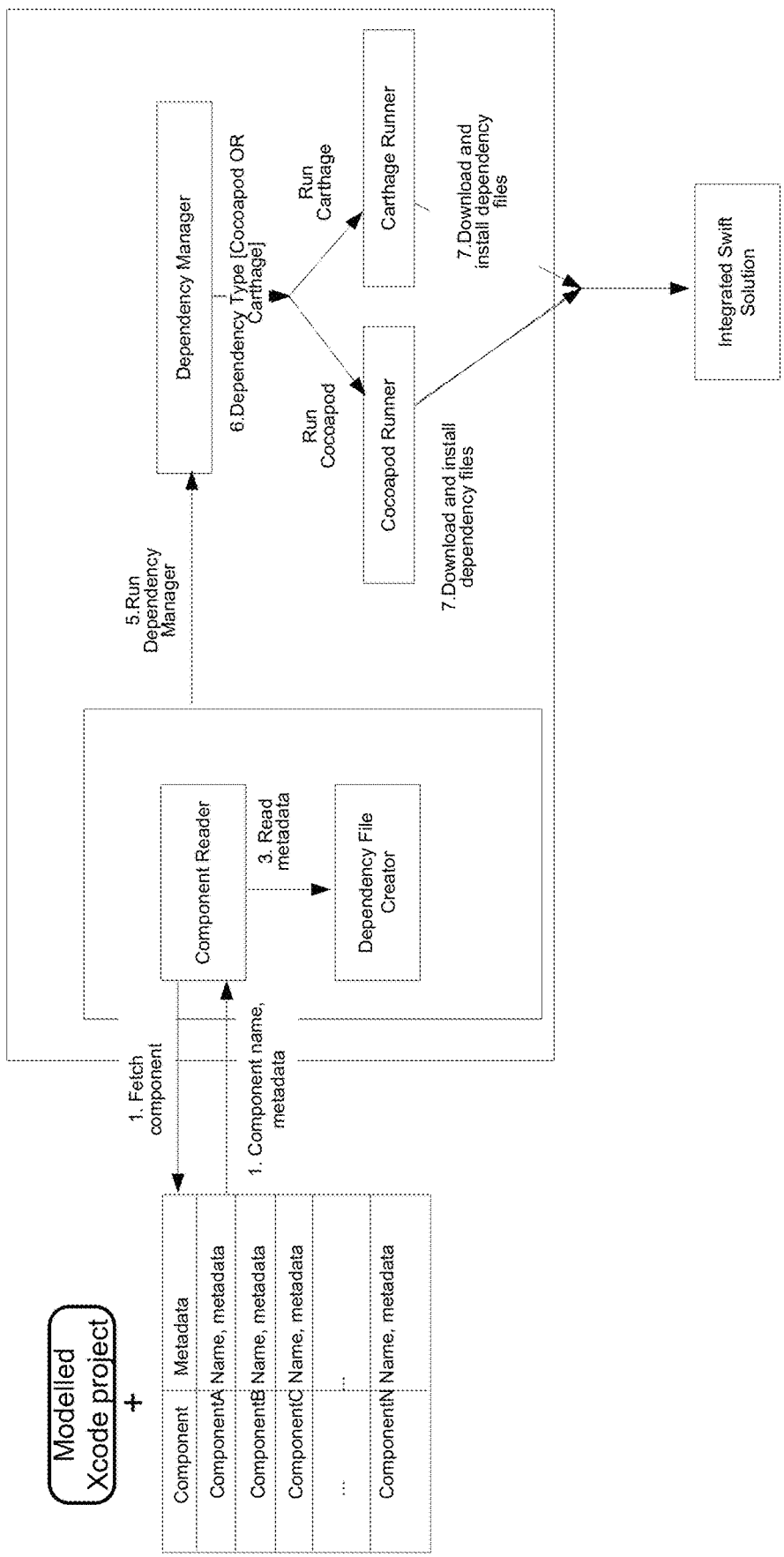
FIG. 5B illustrates further details of a dependency manager from the elements of FIGS. 4 and 5A in accordance with an example of the present disclosure.

FIG. 5B illustrates further details of the dependency manager 130 from the elements of FIGS. 4 and 5A in accordance with an example of the present disclosure.

Referring to FIG. 5B, dependency management may represent the process to manage dependencies (adding, removing, switching versions, etc.). Examples of tools that may be used for dependency management include COCOA PODS™ and CARTHAGE™.

The dependency manager 130 may read the list of components from the component list and respective metadata like version, URL path, and create dependency metadata files to append the details. With respect to the dependency manager, an appropriate dependency manager tool may be used. The respective dependency management tool may then run and install dependency files to create/update the workspace.

Referring to FIG. 5B, the component reader may fetch component metadata from the component list for a given iteration. The dependency file creation may read components metadata, and create/update dependency metadata. The following entries may be updated to a file: add component name, add/append component metadata like version, and URLs, and project specific targets to the files. The dependency manager may download the dependencies (third party component or private components) along with workspace creation via intended interface such as COCOA PODS™ and CARTHAGE™. The dependency manager may identify the dependency manager runner based on type, install dependent components, and update the workspace.

Figure 6:
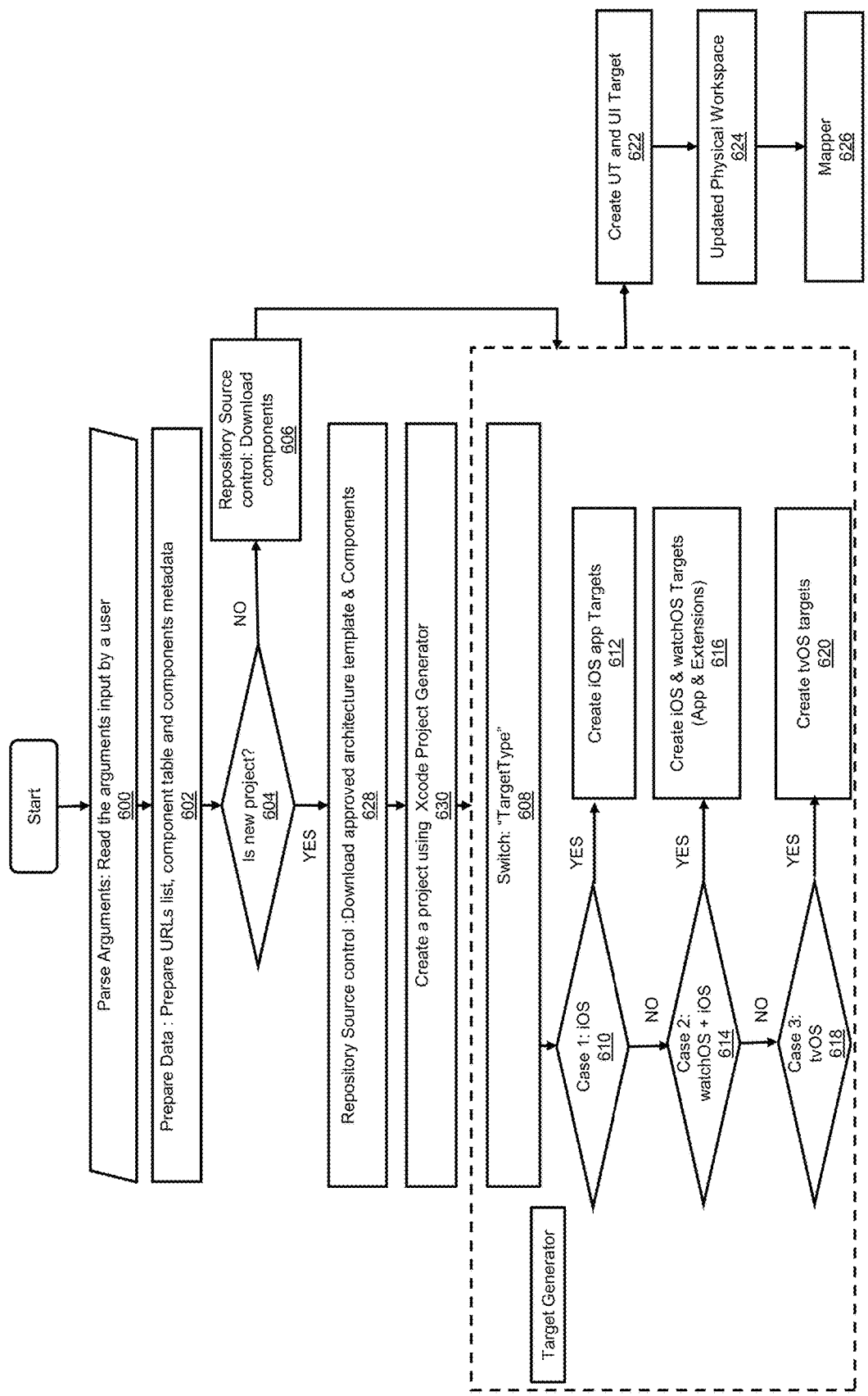
FIG. 6 illustrates an execution flow diagram for downloading architecture templates, components, and related targets generation in accordance with an example of the present disclosure.

FIG. 6 illustrates an execution flow diagram for downloading the architecture templates 124, the components 122, and related targets generation in accordance with an example of the present disclosure. The execution flow of FIG. 6 may correspond to operation of the architecture modeler 120 of FIG. 4. The flow of FIGS. 6-8, in combination, may implement functionality of the apparatus 100 as disclosed herein.

At block 600, the execution flow may include parsing of arguments (e.g., the input 106), for example, by reading of arguments input by a user. The arguments may be parsed by the command line input analyzer 114.

At block 602, the execution flow may include data preparation, which includes preparation of a URLs list, the component list 118, and/or components metadata. As shown in FIG. 4, the configuration manager 116 may generate the component list 118, and further prepare a URLs list, and/or components metadata.

At block 604, the execution flow may include a determination of whether the project 104 includes a new project.

At block 606, in response to a determination at block 604 that the project 104 does not include a new project, the components 122 of the project 104 may be downloaded.

At block 608, further to the components 122 of the project 104 being downloaded at block 606, the execution flow may include switching target type. In this regard, a specific target type may be selected, for example, by a user of the apparatus 100.

At block 610, for example case 1 associated with the IOS™, at block 612, IOS™ application targets may be created.

At block 614, for example case 2 associated with the WATCHOS™ and IOS™, at block 616, WATCHOS™ and IOS™ targets may be created.

At block 618, for example case 3 associated with the TVOS™, at block 620, TVOS targets may be created.

At block 622, the execution flow may include creation of UT and UI targets.

At block 624, the execution flow may include updating of the physical workspace (e.g., see also FIG. 7) for operation of the apparatus 100.

At block 626, the execution flow may proceed to the mapper 128.

At block 628, in response to a determination at block 604 that the project 104 includes a new project, the source repository handler 400 may download approved architecture template and/or components 122 from the workbench repository 200.

At block 630, the project 104 may be created using, for example, the Xcode project generator 402 (e.g., see also FIG. 4). Further processing may proceed to block 608 as shown in FIG. 6.

Figure 7:
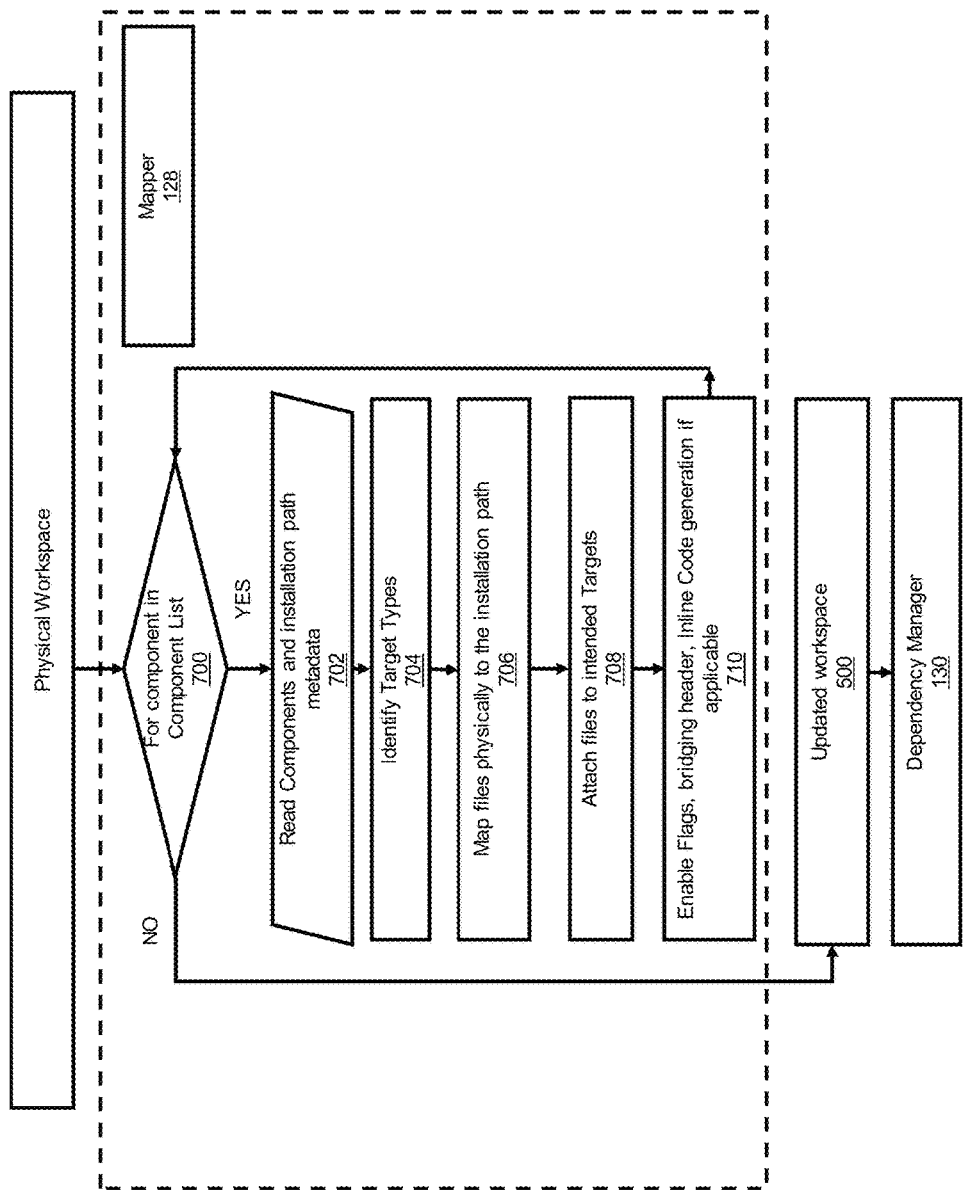
FIG. 7 illustrates a flow diagram for physical and logical mapping of project files to related targets along with metadata integration in accordance with an example of the present disclosure.

FIG. 7 illustrates a flow diagram for physical and logical mapping of project 104 files to related targets along with metadata integration in accordance with an example of the present disclosure. The flow diagram of FIG. 7 may correspond to operation of the mapper 128 of FIG. 5A.

Referring to FIG. 7, with respect to the physical workspace, for the mapper 128, at block 700, a determination may be made as to whether the component is in the component list 118.

In response to a determination at block 700 that the component is not in the component list 118, processing may proceed to the updated workspace 500 (e.g., see also FIG. 5A), and to the dependency manager 130 (e.g., see also FIG.

5A). Once all of the components in the component list are processed, processing may proceed to the updated workspace 500.

In response to a determination at block 700 that the component is in the component list 118, at block 702, the mapping flow may include reading of the components 122 and the installation path metadata.

At block 704, the mapping flow may include identification of target types (e.g., IOS™, MACOS™, WATCHOS™, TVOS™, LINUX™, etc.).

At block 706, the mapping flow may include mapping of files physically to the installation path.

At block 708, the mapping flow may include attachment of files to intended targets.

At block 710, the mapping flow may include enabling of flags, bridging of header, and if applicable, inline code generation.

Figure 8:
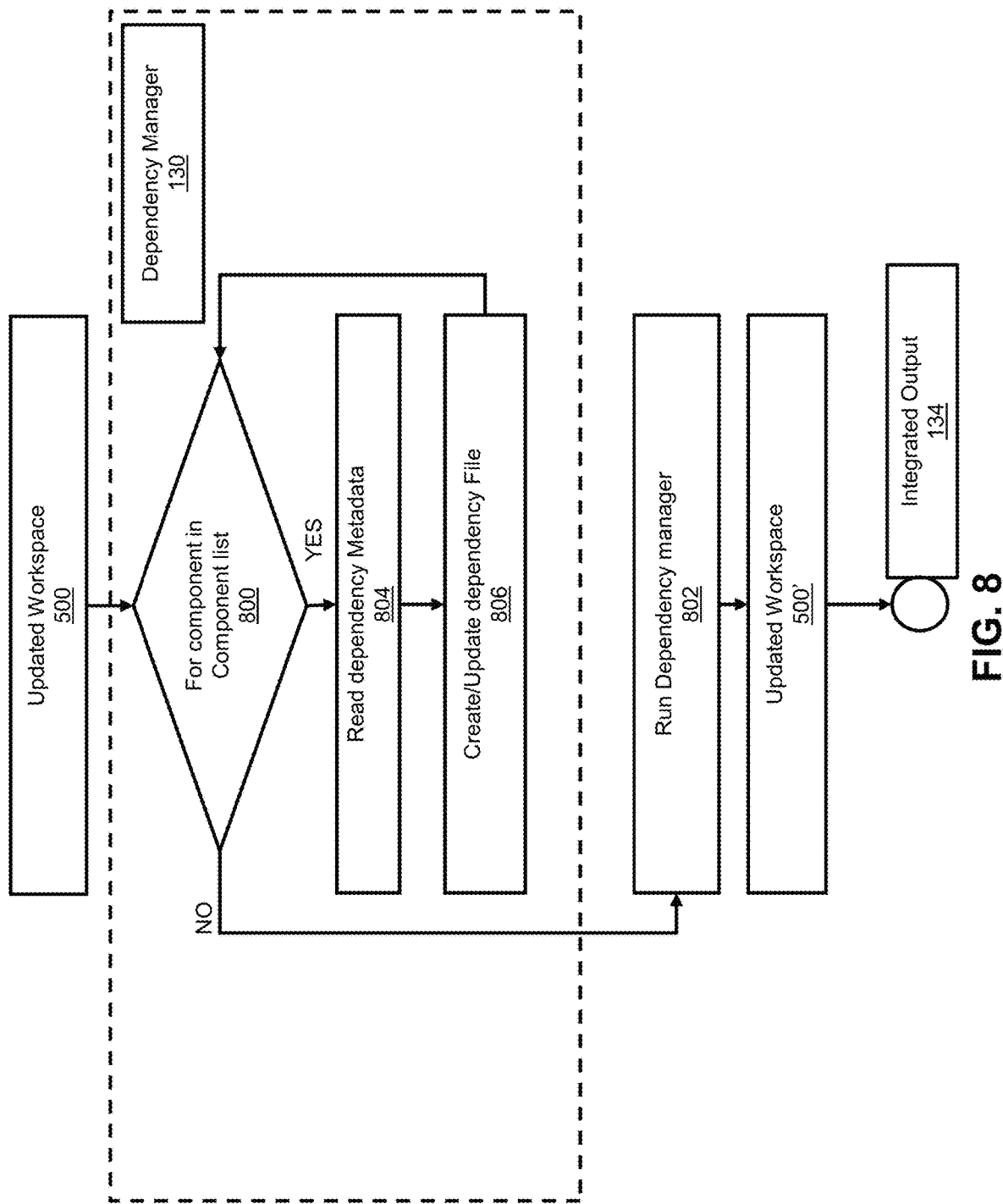
FIG. 8 illustrates a flow diagram for constructing and executing the dependency to generate an integrated output in accordance with an example of the present disclosure.

FIG. 8 illustrates a flow diagram for constructing and executing the dependency to generate the integrated output 134 in accordance with an example of the present disclosure. The flow diagram of FIG. 8 may correspond to operation of the dependency manager 130 of FIG. 5A.

Referring to FIG. 8, with respect to the updated workspace 500 (e.g., see FIG. 5A), for the dependency manager 130, at block 800, a determination may be made as to whether the component is in the component list 118. Once all of the components in the component list are processed, processing may proceed to the updated workspace 500.

In response to a determination at block 800 that the component is not in the component list 118, processing may proceed to block 802, where the dependency manager 130 (e.g., see also FIG. 5A) may be executed. The results of execution of the dependency manager 130 may be generated to further update the workspace (e.g., denoted "updated workspace 500") as the integrated output 134.

In response to a determination at block 800 that the component is in the component list 118, at block 804, the dependency management flow may include reading of dependency metadata.

At block 608, the dependency management flow may include creation and/or update of the dependency file.

Figure 9:
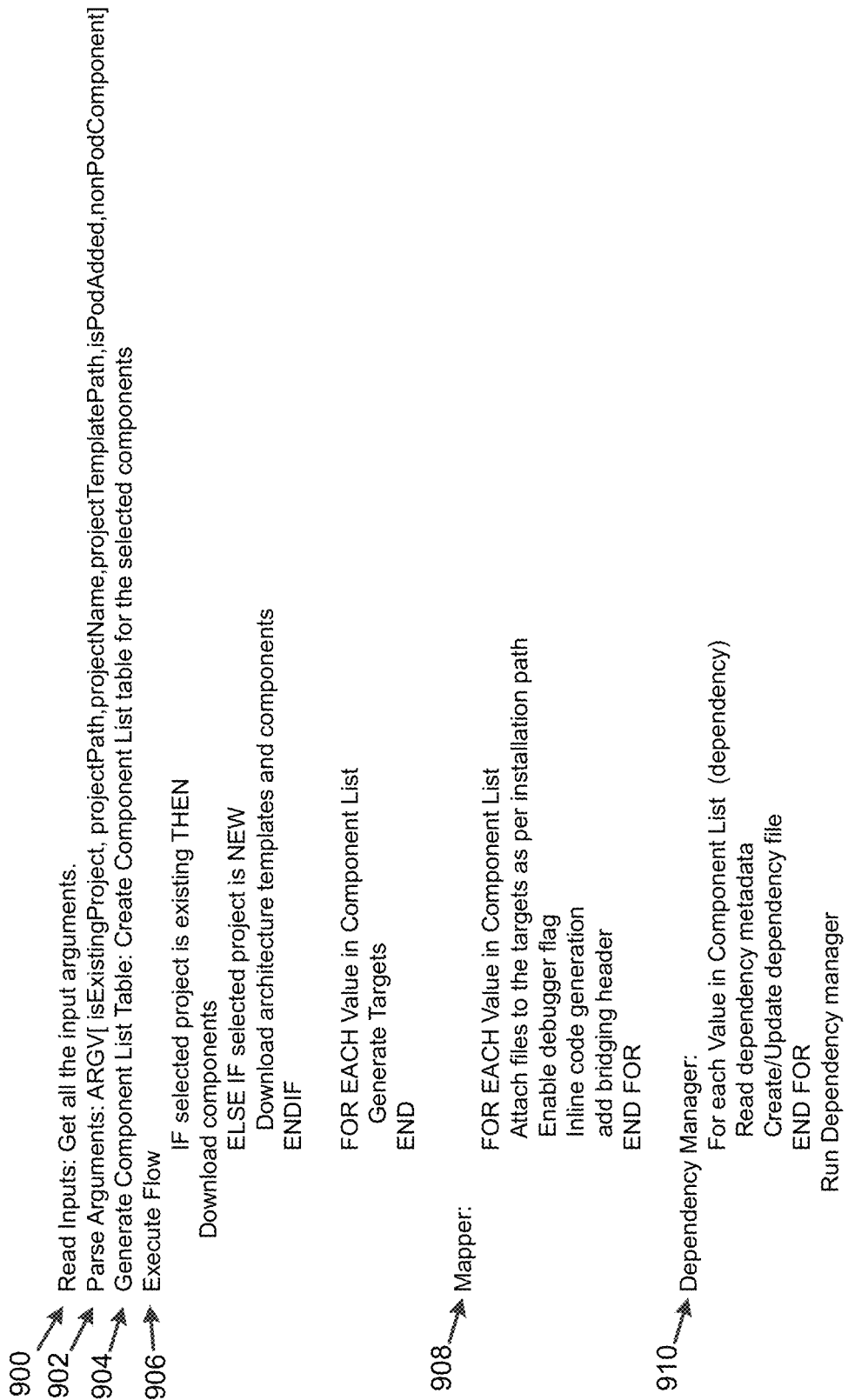
FIG. 9 illustrates application architecture generation in accordance with an example of the present disclosure.

FIG. 9 illustrates application architecture generation in accordance with an example of the present disclosure.

Referring to FIG. 9, the application architecture generation may include reading of input 106 at 900, for example, by the input receiver 102. In this regard, the reading of input 106 at 900 may include obtaining all the input 106 arguments. An example of the input 106 may include a project name, the target 126 (e.g., a watch, a television, etc.), a project template type (e.g., a type of user interface, etc.), the components 122 (e.g., to display a particular feature, to evaluate a particular feature, etc.), etc. A template may be described as a base framework for the application 136, and a structure for the application 136 with respect to source code.

At 902, the application architecture generation may include parsing of arguments (e.g., ARGV [isExistingProject, projectPath, project Name, projectTemplatePath, isPodAdded, nonPodComponent]) for the input 106. For example, the application architecture generation may include parsing of arguments for the input 106, for example, by the command line input analyzer 114.

At 904, the application architecture generation may include generation of the component list 118, for example, by the configuration manager 116. In this regard, generation of the component list 118 may include creation of the component list 118 for the selected components 122.

At 906, the application architecture generation may include flow execution, for example, by the architecture modeler 120. In this regard, flow execution may include downloading the architecture templates 124, the components 122, and related targets generation. For example, if the selected project 104 is existing, then the components 122 may be downloaded. Otherwise, if the selected project 104 is new, the architecture templates 124 and the components 122 may be downloaded. Further, for each value in the component list 118, targets may be generated.

At 908, the application architecture generation may include mapping, for example, by the mapper 128. In this regard, for each value in the component list 118, files may be attached to targets as per an installation path, a debugger flag may be enabled, inline code generation may be performed, and a bridging header may be added. The files that are attached to targets may include source code files, for example, for the components 122 that are selected. The debugger flag may represent flags that are needed for source code compilation. Inline code may represent code that is injected into existing code, for example, for push notification. The bridging header may be described as a SWIFT™ bridging header that allows for communication with objective-C classes from SWIFT™ classes.

At 910, the application architecture generation may include dependency management, for example, by the dependency manager 130. In this regard, for each value in the component list 118 (dependency), dependency metadata may be read, and a dependency file may be created and/or updated. Further, the dependency manager 130 may be executed. The dependency may be described as a hierarchical relationship between different components 122, where a component may need one or more additional components to perform a specified task.

FIG. 10 illustrates parse arguments with respect to application architecture generation in accordance with an example of the present disclosure.

Referring to FIG. 10, with respect to the parse arguments at 902 of FIG. 9, the function ARGV [isExistingProject, projectPath, projectName, projectTemplatePath, isPodAdded, nonPodComponent] may read argument values associated with different aspects of the input 106. For example, at 1000, a new project 104 (e.g., isNewProject) may be assigned an argument value of '0', at 1002, a project path (e.g., ProjectPath) may be assigned an argument value of '1', etc.

FIG. 11 illustrates component list generation with respect to application architecture generation in accordance with an example of the present disclosure.

Referring to FIG. 11, with respect to generation of the component list 118 at 904 of FIG. 9, the function GenerateComponentList(listofComponents 122[ ]) at 1100 may generate the component list 118 by declaring an array of component dictionary. In this regard, a component array may be generated based on the list of components 122 selected, for example, by a user. In this regard, the Parse JSON functionality may be utilized. At 1102, the function ParseJSON (component) may include reading of JSON content from the master configuration file (e.g., see FIG. 4), determination of raw file data, and invoking of a JSON.parse library function to return a component dictionary. At 1104, the function lookUpComponent(parsed, ComponentName, *rest) may be described as a lookup function to search required value for a given hash key.

FIG. 12 illustrates flow execution with respect to application architecture generation in accordance with an example of the present disclosure.

Referring to FIG. 12, with respect to flow execution at 906, for example, by the architecture modeler 120, at 1200, for an existing project 104, components 122 may be downloaded (e.g., Template is set as False). The component array may represent the component array generated at 1100 in FIG. 11. Further, at 1200, architecture templates 124 may not be downloaded (e.g., Template is set as False). Alternatively, at 1202, for a new project 104, a new project name and path may be created, and architecture templates 124 and components 122 may be downloaded. At 1202, architecture templates 124 may be downloaded. At 1204, for each component in the component dictionary, the templates and component for a new scenario may be fetched. At 1206, a target may be specified as needed.

FIG. 13 illustrates project creation, and downloading of project templates and components 122 with respect to application architecture generation in accordance with an example of the present disclosure.

Referring to FIG. 13, the flow execution at 906 of FIG. 9 may continue with respect to project creation, and downloading of project templates and components 122. In this regard, at 1300, an Xcode project 104 instance may be created. Further, downloading of project templates and components 122 may be performed at 1302.

FIG. 14 illustrates project creation, and downloading of project 104 templates and components 122 with respect to application architecture generation in accordance with an example of the present disclosure.

Referring to FIG. 14, the flow execution at 906 of FIG. 9 may continue with respect to project creation, and downloading of project templates and components 122. In this regard, a temporary folder path for the components 122 may be defined at 1400. At 1402, a template may be downloaded (e.g., based on an associated URL) to a project path, and alternatively, at 1404, components 122 may be downloaded (e.g., based on an associated URL) to a temporary folder path.

FIG. 15 illustrates checking and creation of target types with respect to application architecture generation in accordance with an example of the present disclosure.

Referring to FIG. 15, the flow execution at 906 of FIG. 9 may continue with respect to checking and creation of target types. In this regard, at 1500, checking and creation of target types may be performed for IOS™ application target object, WATCHOS™ application target object, WATCHOS™ extension target object, etc. The target type may be selected, for example, by a user during the input phase as disclosed at 900 with reference to FIG. 9. Further, at 1502, for IOS™, the function "createIOSAppTarget( )" may be called, for WATCHOS™ and IOS™, the function "createWatchOSAppTarget( )" may be called, etc.

FIGS. 16A and 16B illustrate target creation with respect to application architecture generation in accordance with an example of the present disclosure.

Referring to FIG. 16A, the flow execution at 906 of FIG. 9 may continue with respect to target creation. In this regard, at 1600, the app_targetObj (e.g., IOS™ application target object) may be created. Further, a new target 126 may be installed based on the IOS™ target type. At 1602, the watchos_app_targetObj (e.g., watch application target object) may be created. Further, a new target may be installed based on the WATCHOS™ target type. At 1604, the watchos_extension_targetObj (e.g., watch extension target object) may be created. Further, a new target may be installed based on the WATCHOS™ target type.

Referring to FIG. 16B, at 1606, the tvos_app_targetObj (e.g., television application target object) may be created. A new target may be installed based on the TVOS™ target type. Further, at 1608, the tvos_extension_targetObj (e.g., television extension target 126 object) may be created. A new target may be installed based on the TVOS™ target 126 type.

FIGS. 17A and 17B illustrate physical and logical mapping of files with respect to application architecture generation in accordance with an example of the present disclosure.

Referring to FIG. 17A, with respect to physical and logical mapping of files at 908, for example, by the mapper 128, at 1700, files may be physically mapped to the installation path, for example by copying files to the installation path. In this regard, the fetchTargetObject function may be called, and further, a destination path may be created as the installation path and the component name. Further, at 1702, files may be logically attached to the installation path. For example, for a UT test case, files may be added to UTFolderPath, etc.

Referring to FIG. 17B, with respect to physical and logical mapping of files at 908, for example, by the mapper 128, at 1704, if needed, compilation flags may be enabled. At 1706, if needed, a bridging header may be added. AT 1708, if needed, inline code may be added.

FIG. 18 illustrates variable declaration for mapping with respect to application architecture generation in accordance with an example of the present disclosure.

Referring to FIG. 18, with respect to operation of the mapper 128 at 908 of FIG. 9, at 1800, variables may be declared for the mapping. In this regard, the variables may be declared for target type at 1802, folder path at 1804, installation path at 1806, etc.

FIG. 19 illustrates fetching of target objects with respect to application architecture generation in accordance with an example of the present disclosure.

Referring to FIG. 19, with respect to operation of the mapper 128 at 908 of FIG. 9, at 1900, target objects may be fetched. In this regard, at 1902, for the case of IOS™, IOS™ application target object may be fetched. At 1904, for the case of WATCHOS™ application, WATCHOS™ application target object may be fetched, and so forth for other target objects.

FIG. 20 illustrates logical adding of files to targets with respect to application architecture generation in accordance with an example of the present disclosure.

Referring to FIG. 20, with respect to operation of the mapper 128 at 908 of FIG. 9, at 2000, files may be logically added to targets. In this regard, at 2002, if a file is determined to be a directory, then a new group may be created with the name of the file. Alternatively, at 2004, for each item in the destination path, a reference of files (e.g., designated SWIFT™ files) may be created and added to the target object.

FIG. 21 illustrates adding of compilation flags with respect to application architecture generation in accordance with an example of the present disclosure.

Referring to FIG. 21, with respect to operation of the mapper 128 at 908 of FIG. 9, at 2100, compilation flags may be added. In this regard, at 2102, for each configuration in targets, and for each of the settings in the compilation flags, debugger flags and build settings may be set to the intended target.

FIG. 22 illustrates adding of a bridging header with respect to application architecture generation in accordance with an example of the present disclosure.

Referring to FIG. 22, with respect to operation of the mapper 128 at 908 of FIG. 9, at 2200, a bridging header may be added. In this regard, at 2202, the existence of a bridging header file may be analyzed. At 2204, an iteration may be performed over a bridging header import array to fetch import details.

FIG. 23 illustrates adding of inline code with respect to application architecture generation in accordance with an example of the present disclosure.

Referring to FIG. 23, with respect to operation of the mapper 128 at 908 of FIG. 9, at 2300, inline code may be added. In this regard, at 2302, inline content may be read from a placeholder file. At 2304, for the destination file handler where content needs to be placed, the content may be identified and replaced.

FIG. 24A illustrates creation and update of dependencies with respect to application architecture generation in accordance with an example of the present disclosure.

Referring to FIG. 24A, with respect to creation and update of dependencies at 910, for example, by the dependency manager 130, at 2400, the dependency manager 130 may create and update dependencies. In this regard, the dependency manager 130 may identify the dependency name, URL, and version.

FIG. 24B illustrates dependency execution with respect to application architecture generation in accordance with an example of the present disclosure.

Referring to FIG. 24B, with respect to operation of the dependency manager 130 at 910 of FIG. 9, at 2402, various aspects such as enabling of compilation flags, etc., may be determined. At 2404, the dependency manager 130 may be executed, for example, with respect to specific types of dependencies.

FIGS. 25A-25K illustrate sequence diagrams for various elements of the apparatus 100 in accordance with an example of the present disclosure.

Figure 25A:
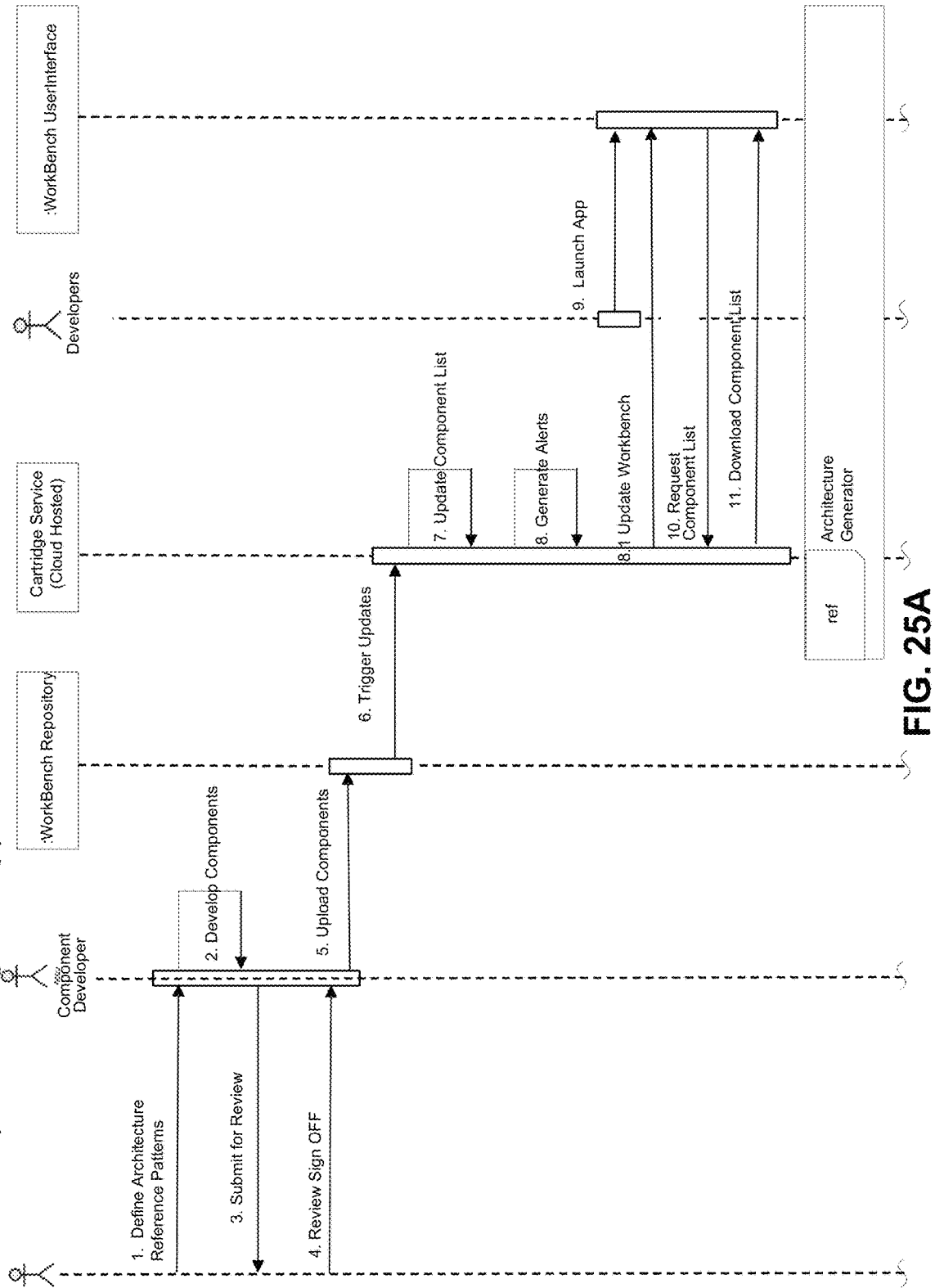
FIGS. 25A-25K illustrate sequence diagrams for various elements of the application architecture generation apparatus of FIG. 1 in accordance with an example of the present disclosure.

Referring to FIG. 25A, a sequence diagram with respect to the apparatus 100 and an end-to-end interaction with a client is illustrated. The various steps of the sequence diagram are listed as 1-11, beginning from defining of architecture reference patterns at step 1, and concluding at downloading of component list at step 11.

Figure 25B:
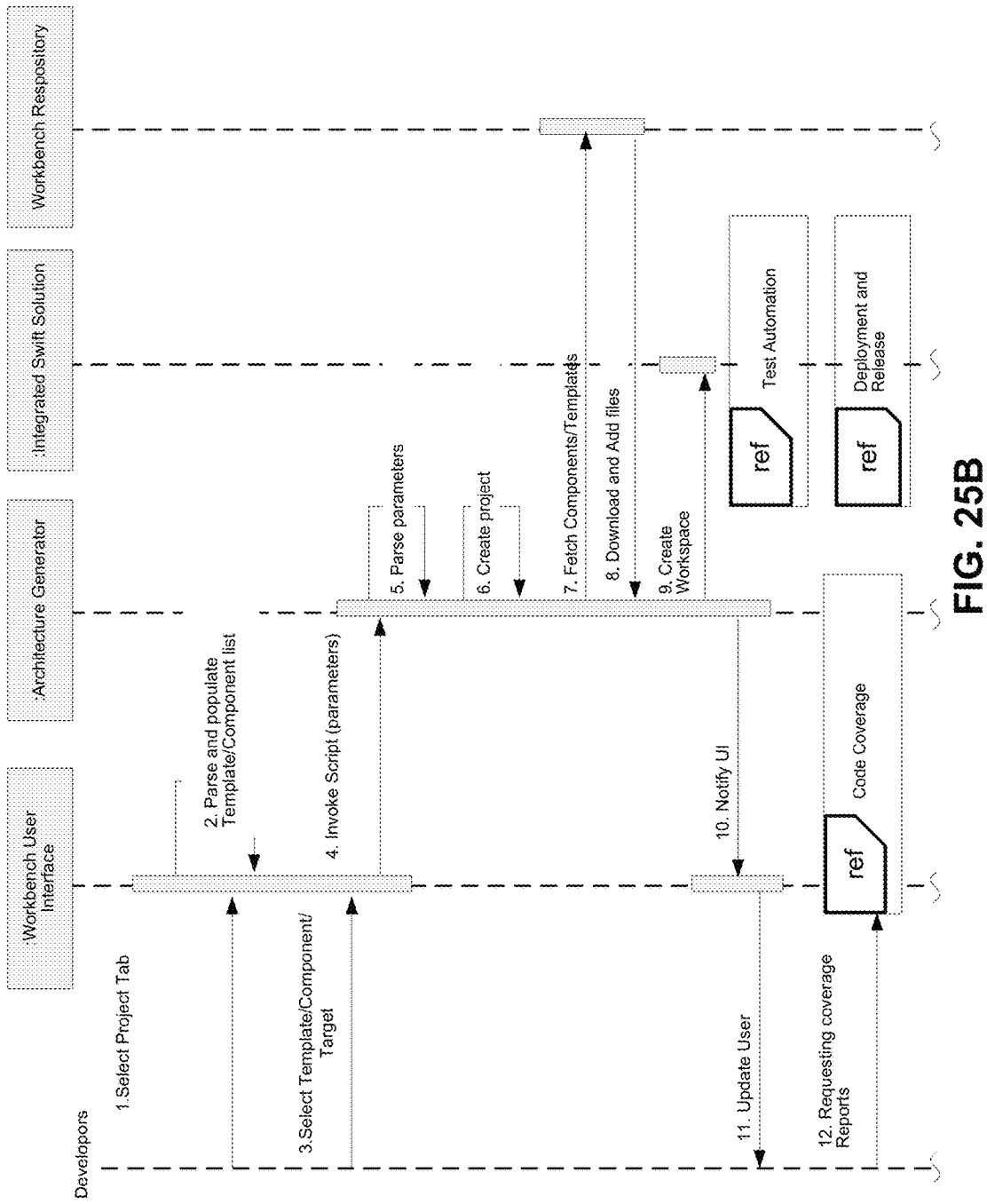

Referring to FIG. 25B, a sequence diagram with respect to the apparatus 100 is illustrated. The various steps of the sequence diagram are listed as 1-9, beginning from selecting of project tab at step 1, and concluding at workspace creation at step 9.

Figure 25C:
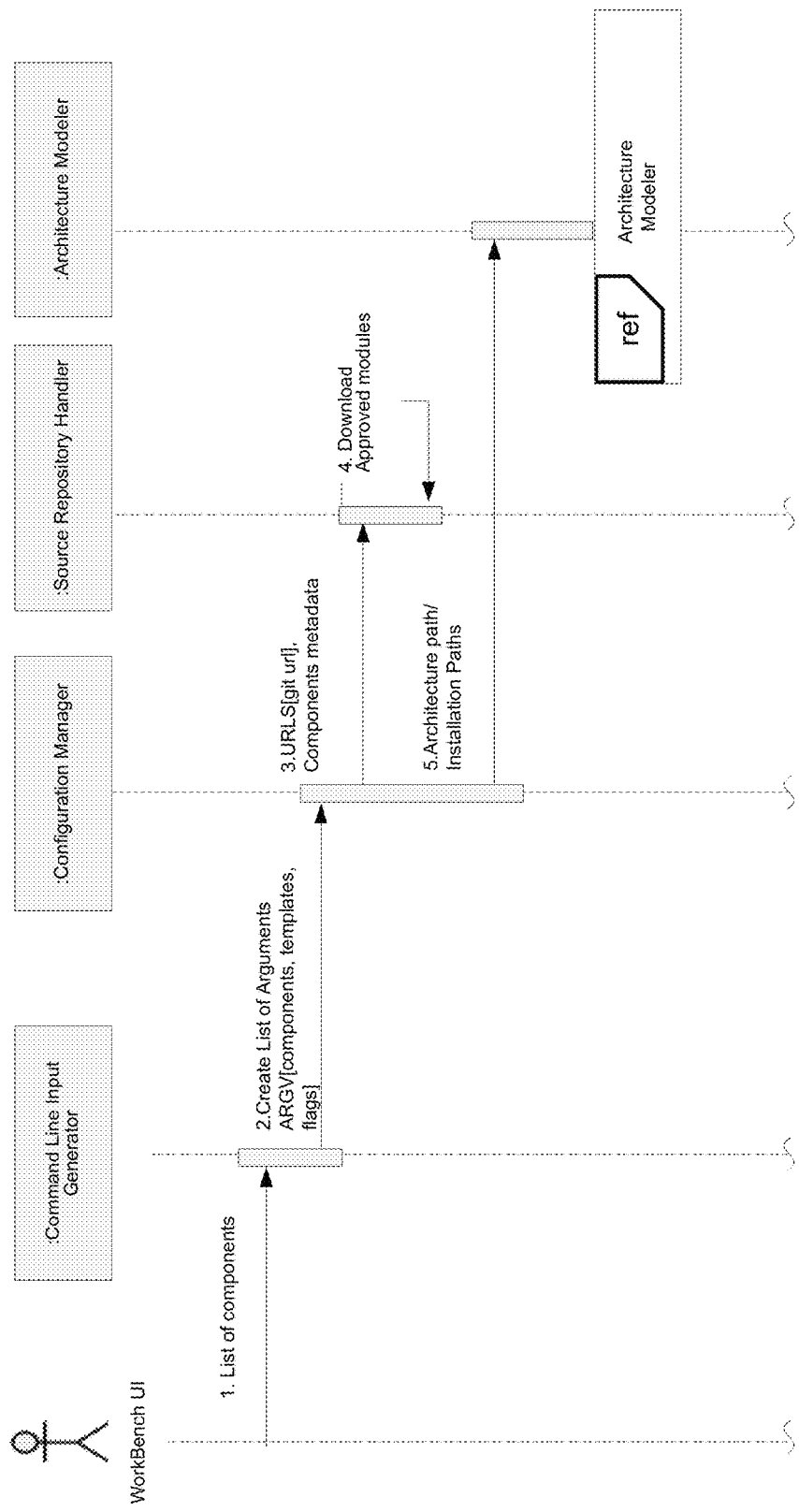

Referring to FIG. 25C, a sequence diagram with respect to the apparatus 100 is illustrated. The various steps of the sequence diagram are listed as 1-5, beginning from ascertaining a list of components at step 1, and concluding at the architecture path/installation paths at step 5.

Figure 25D:
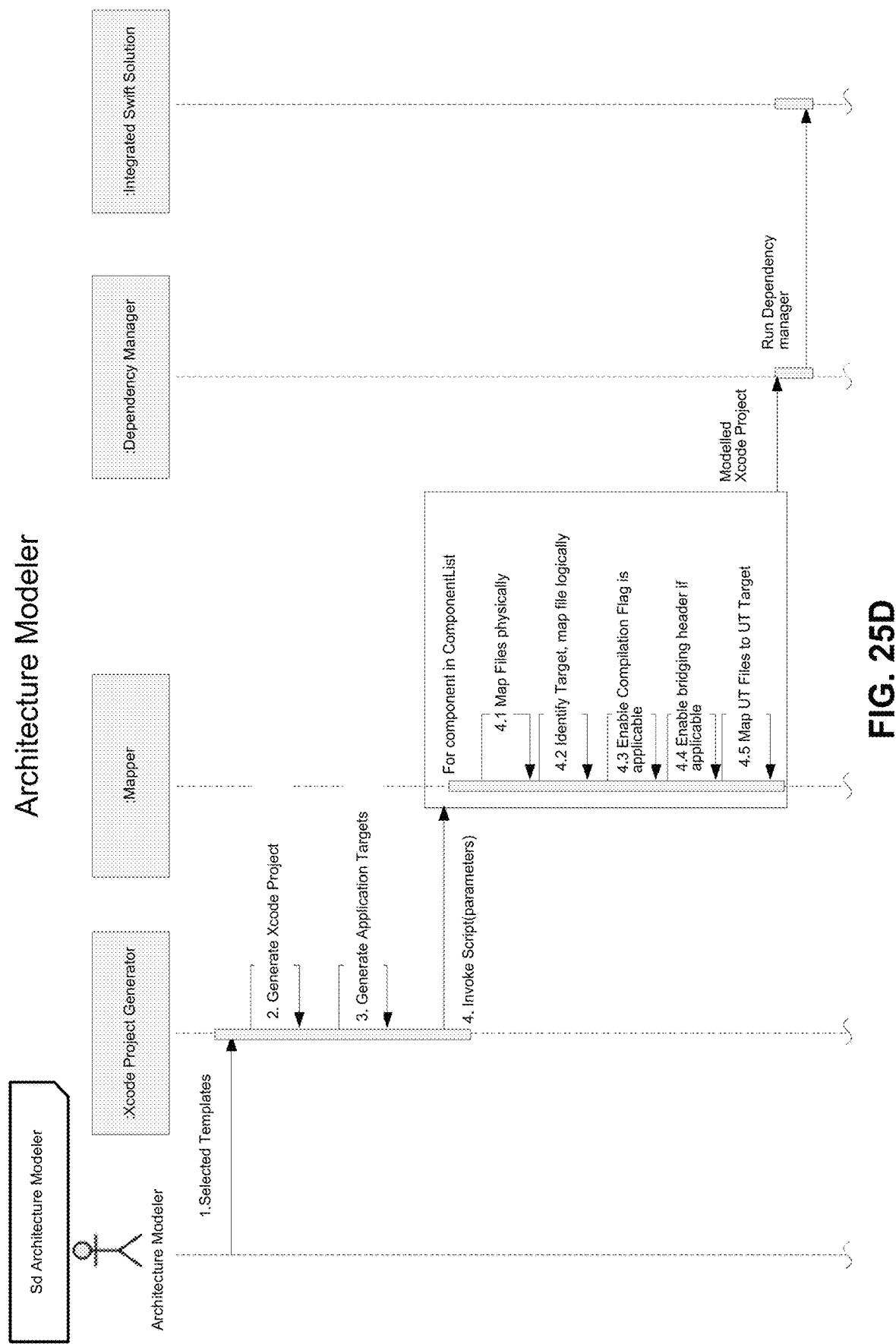

Referring to FIG. 25D, a sequence diagram with respect to the architecture modeler 120 is illustrated. The various steps of the sequence diagram are listed as 1-4, beginning from selection of templates at step 1, and concluding at invoking script (parameters) at step 4, and further processing listed at steps 4.1 to 4.5.

Figure 25E:
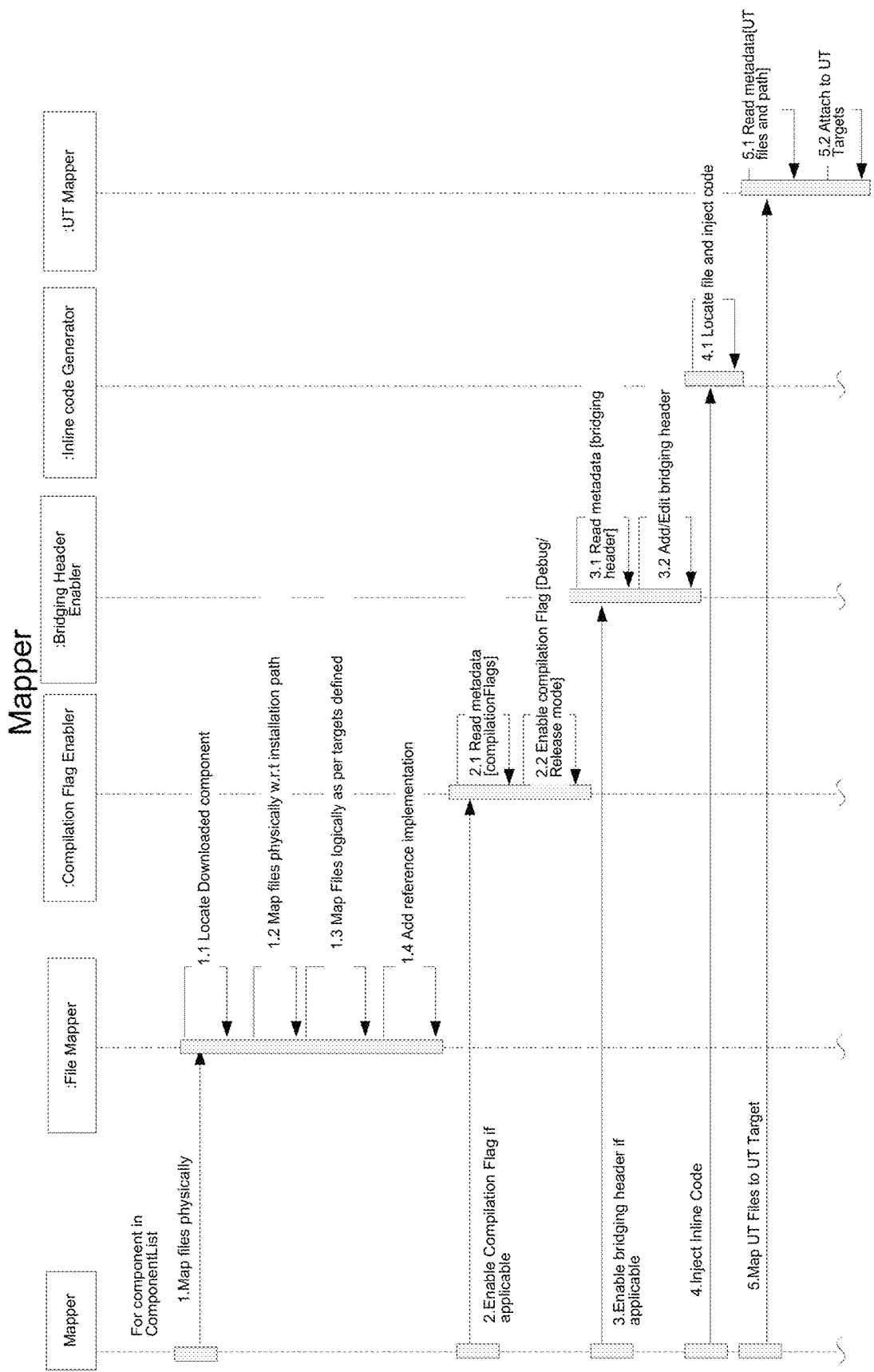

Referring to FIG. 25E, a sequence diagram with respect to the mapper 128 is illustrated. The various steps of the sequence diagram are listed as 1-5, beginning from mapping files physically at step 1, and concluding at mapping UT files to UT target at step 5.

Figure 25F:
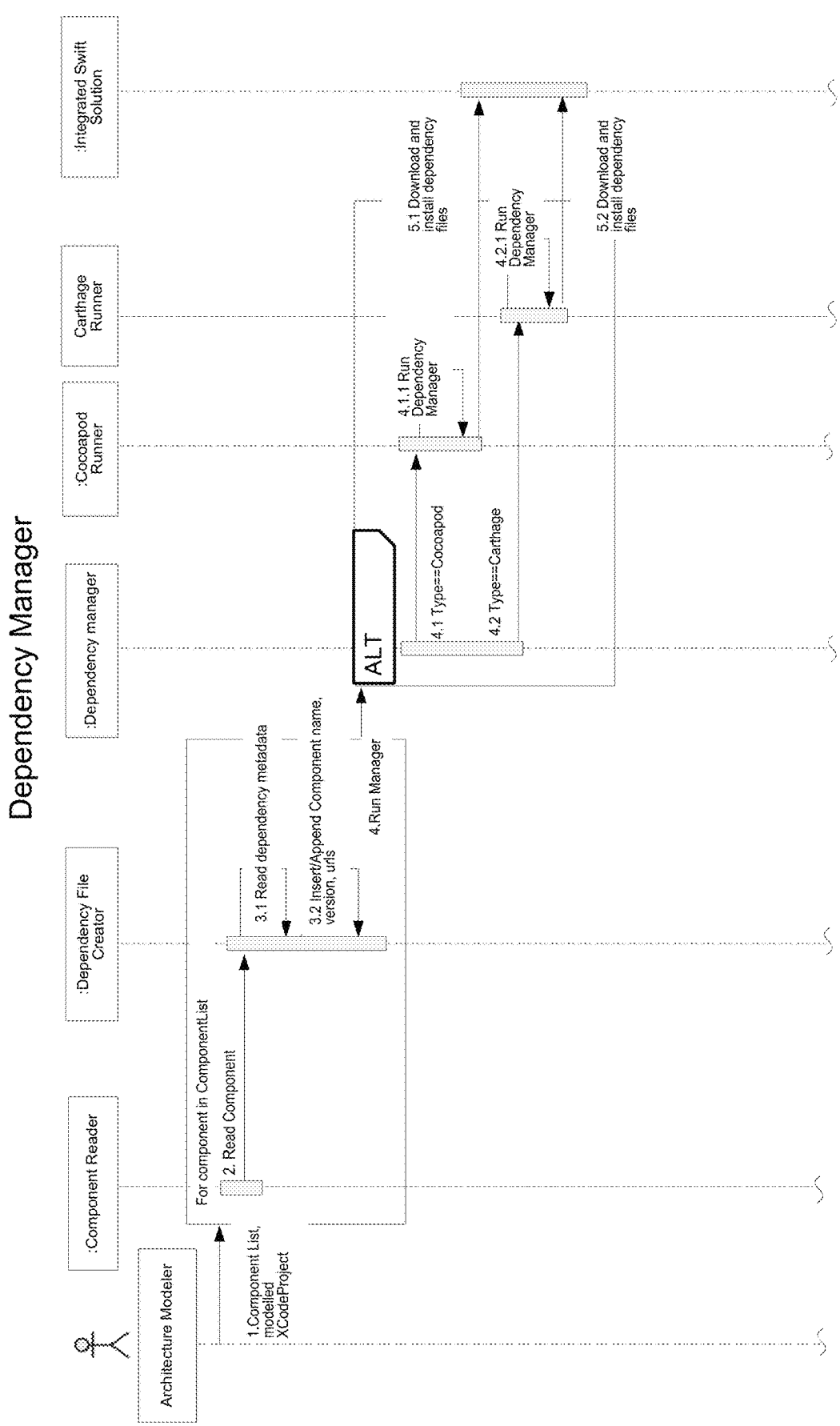

Referring to FIG. 25F, a sequence diagram with respect to the dependency manager 130 is illustrated. The various steps of the sequence diagram are listed as 1-5, beginning from ascertaining component list at step 1, and concluding at downloading and installation of dependency files at steps 5.1 and 5.2.

Figure 25G:
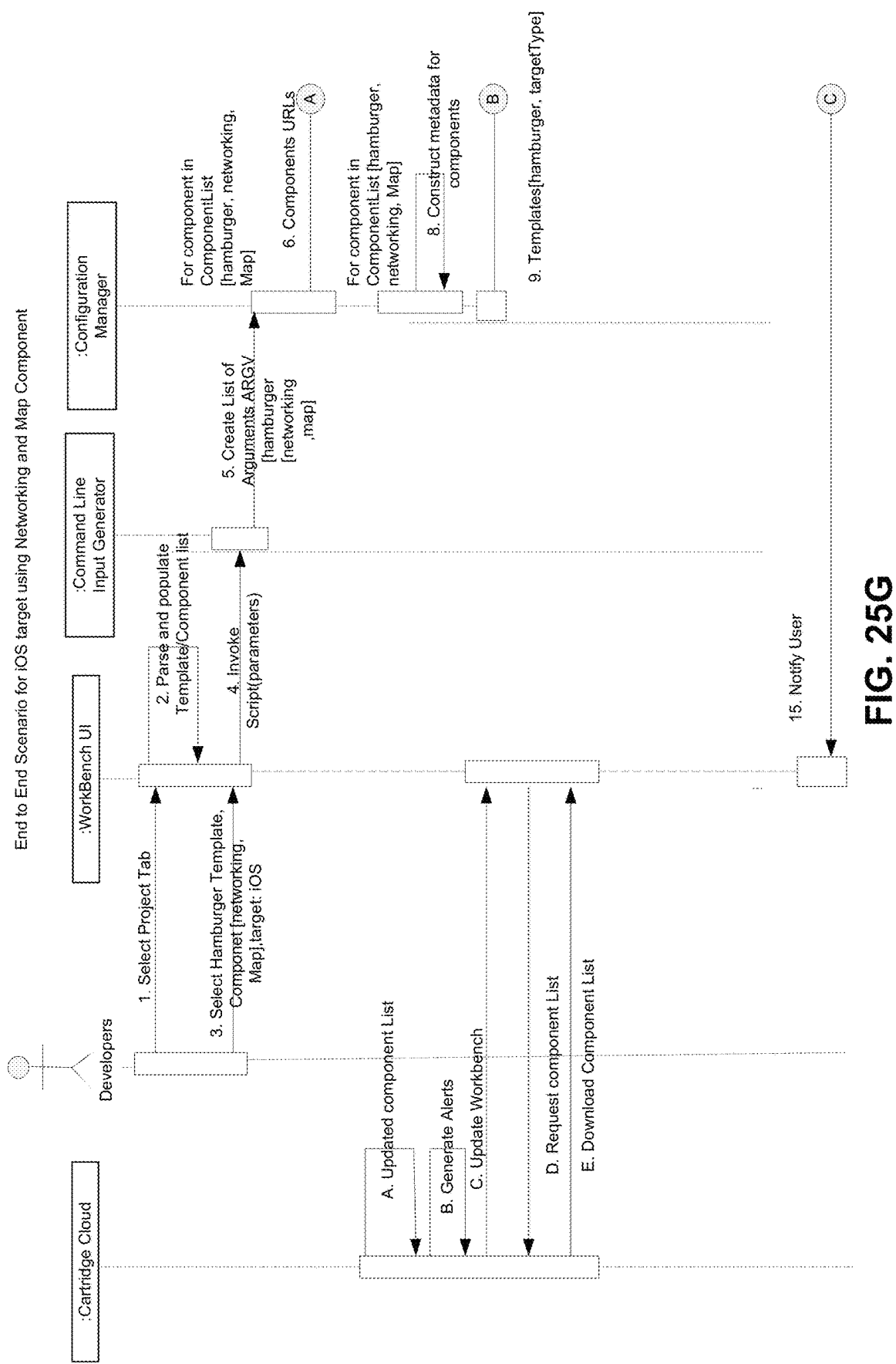
Figure 25G:
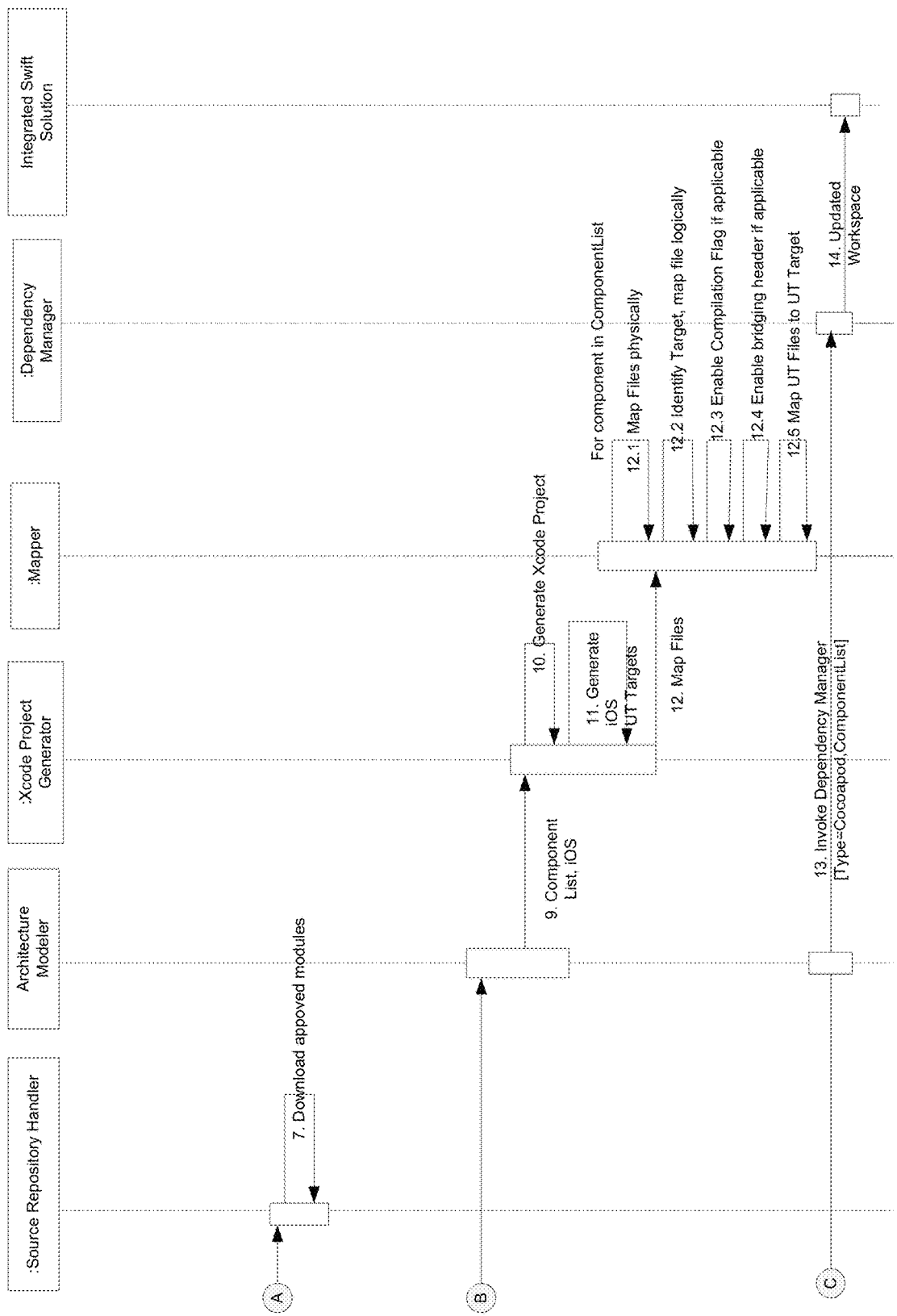

Referring to FIG. 25G, an end to end scenario for IOS™ target using networking and map component is illustrated. The various steps of the scenario are listed as 1-15, beginning from selection of project tab at step 1, and concluding at notifying user at step 15.

Figure 25H:
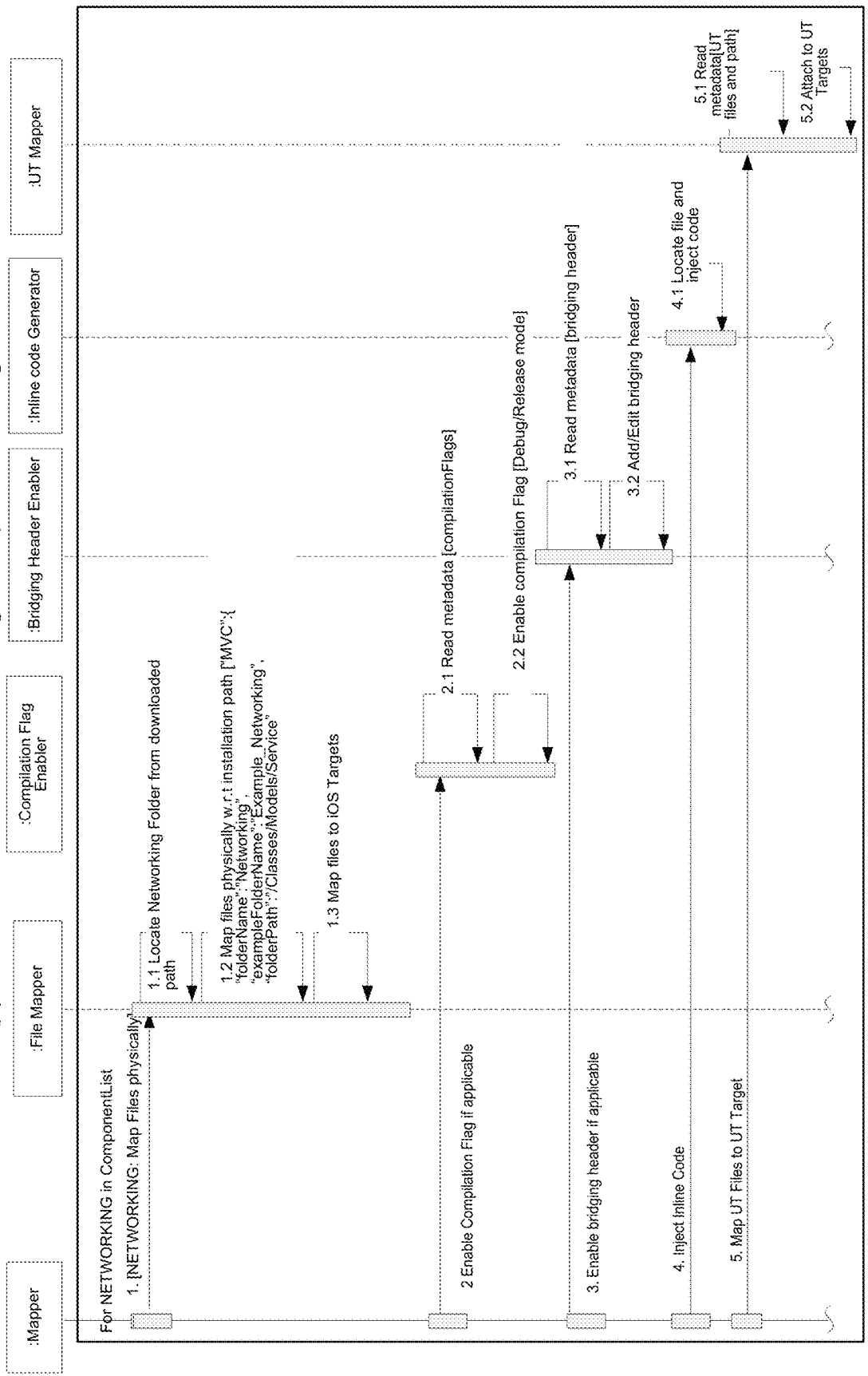

Referring to FIG. 25H, a mapper extension for networking component integration is illustrated. The various steps of the flow are listed as 1-5, beginning from mapping files physically at step 1, and concluding at mapping of UT files to UT target at step 5.

Figure 25I:
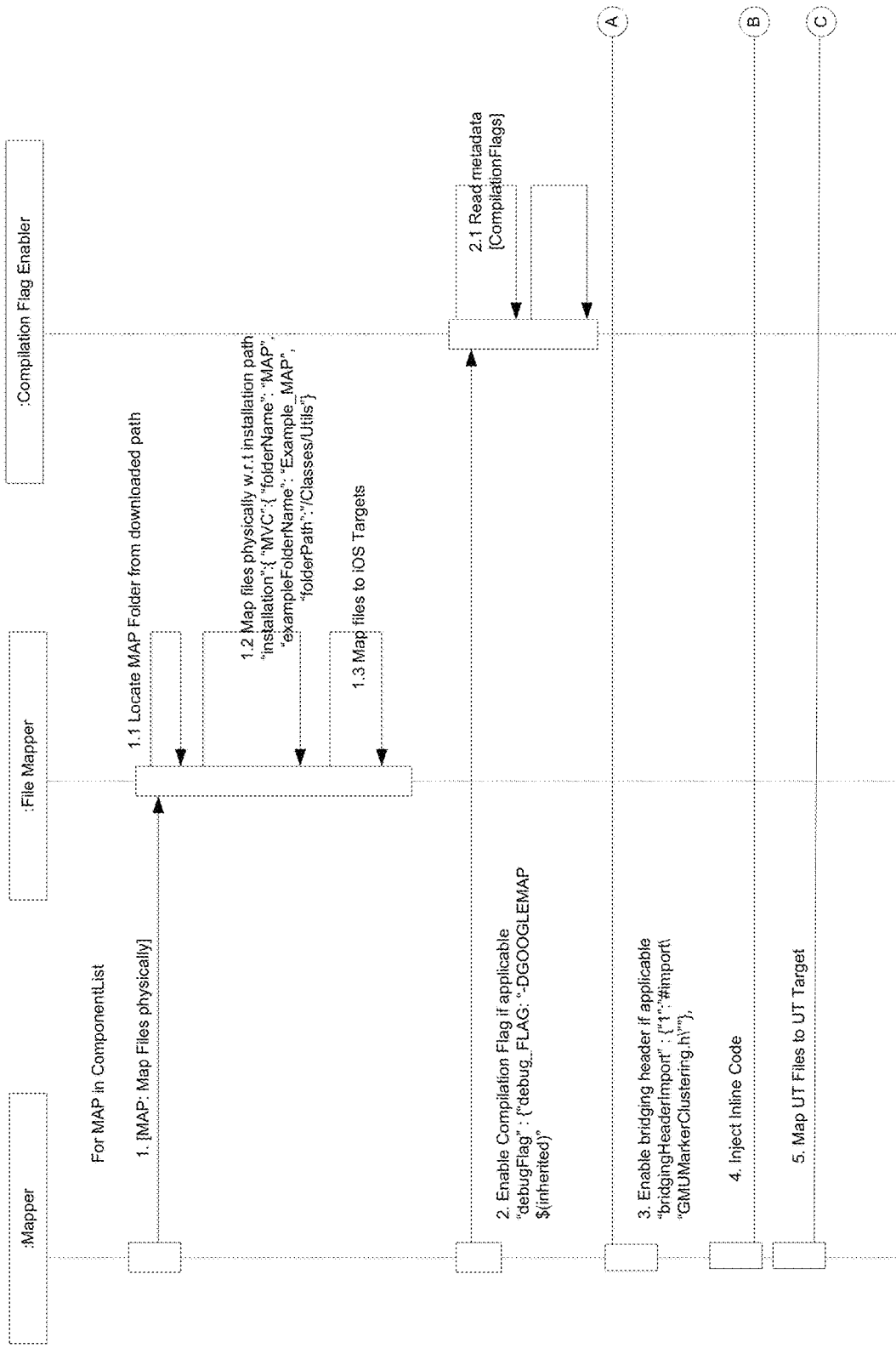
Figure 25I:
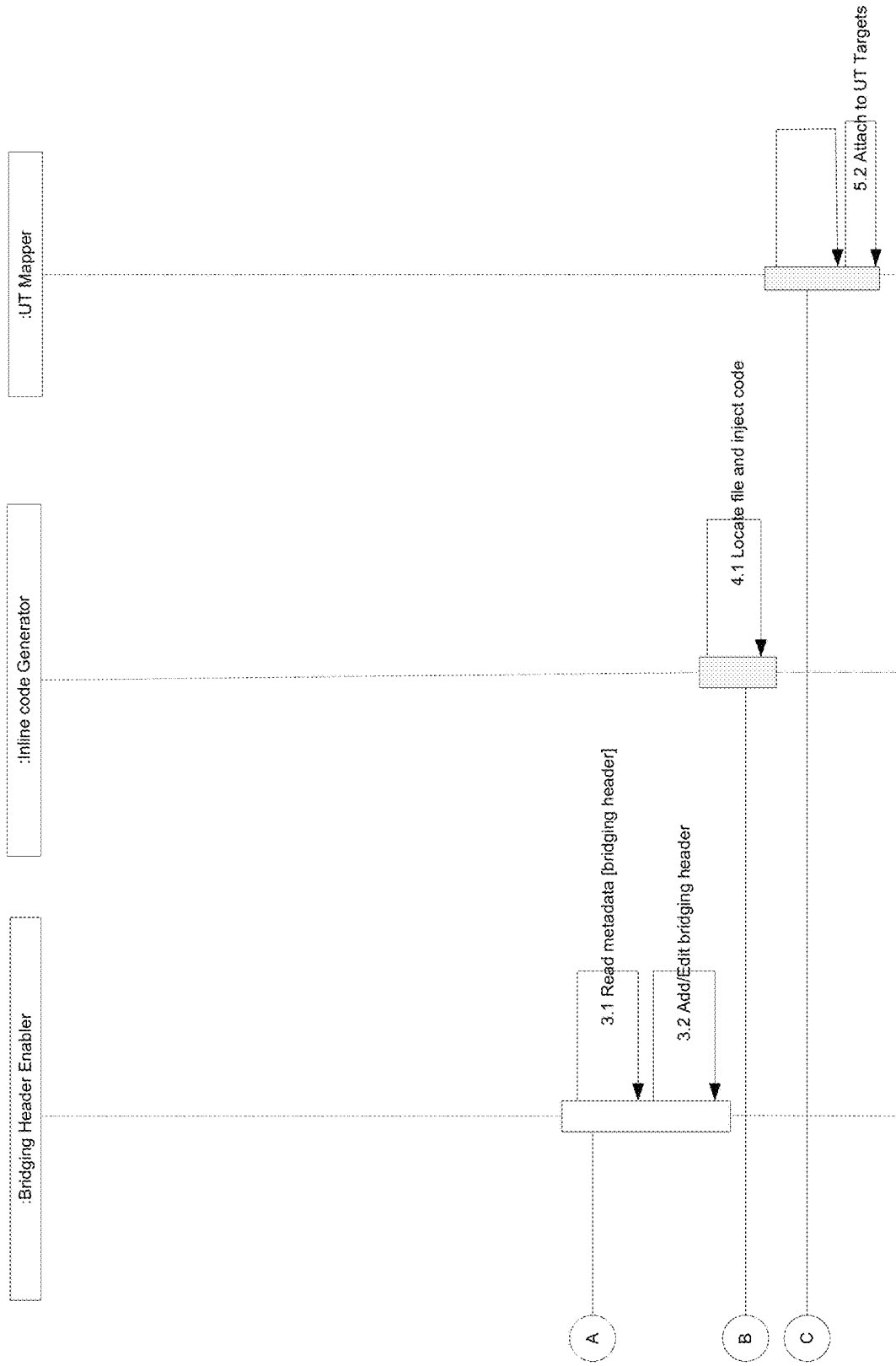

Referring to FIG. 25I, a mapper extension for map component integration is illustrated. The various steps of the flow are listed as 1-5, beginning from mapping files physically at step 1, and concluding at mapping of UT files to UT target at step 5.

Figure 25J:
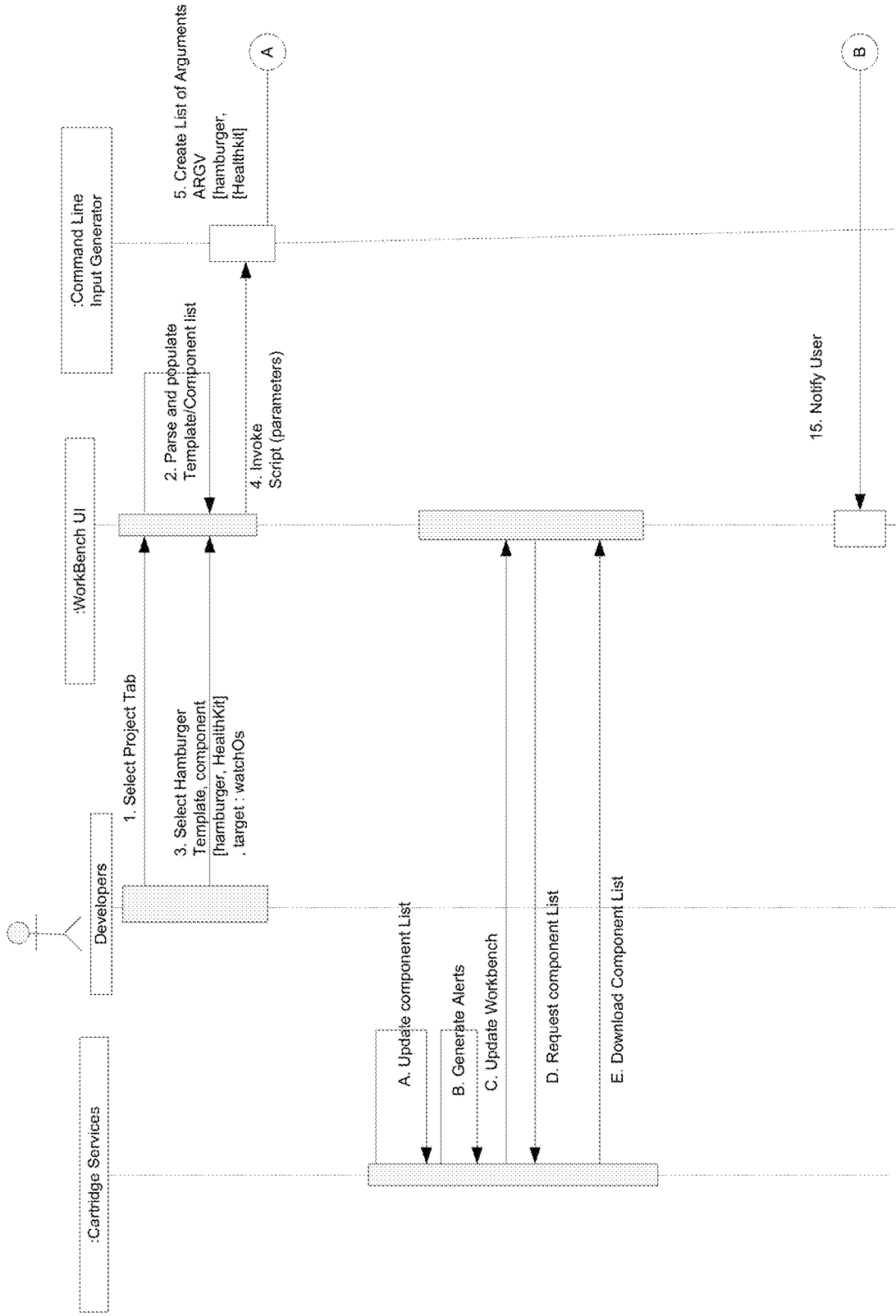
Figure 25J:
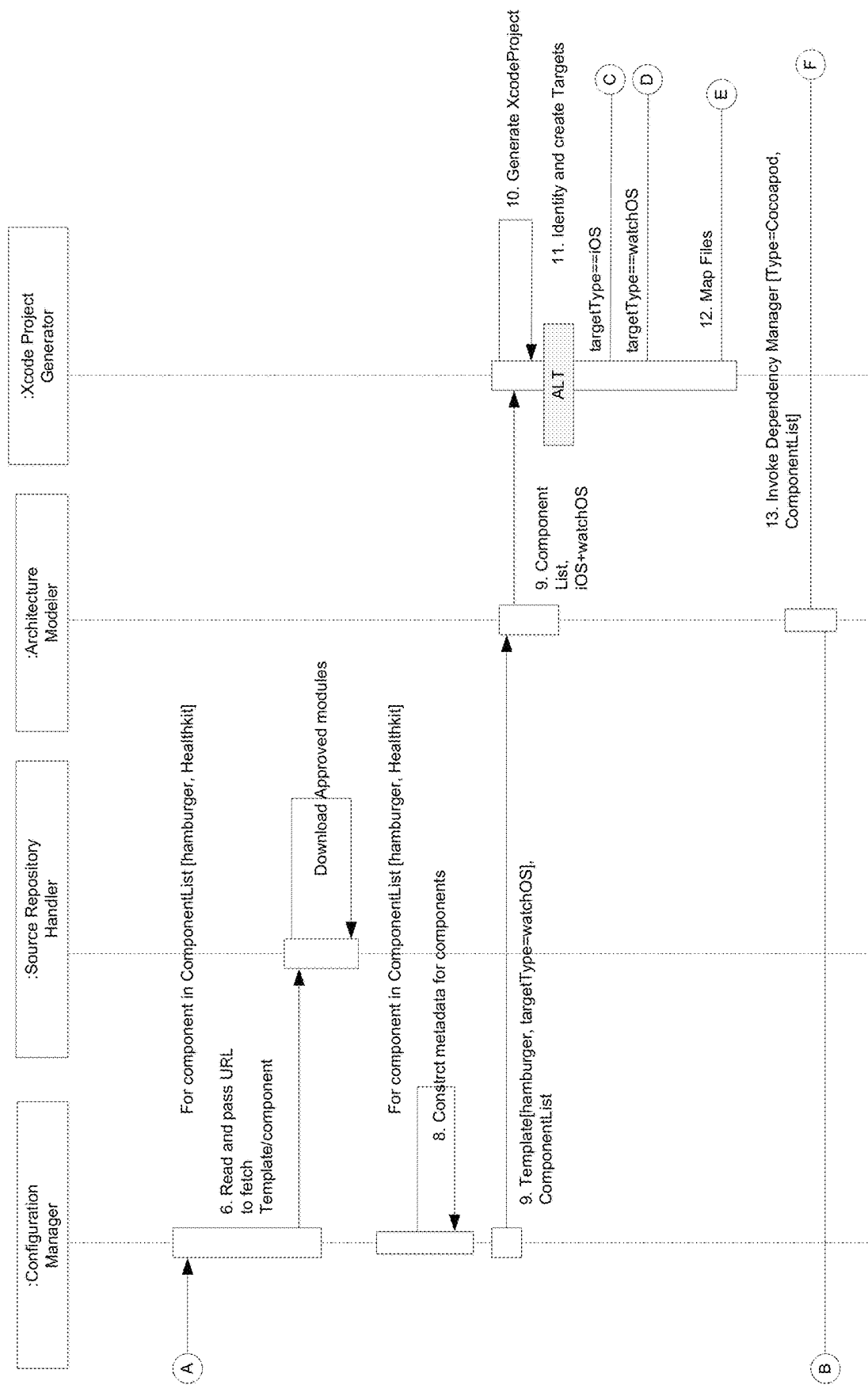
Figure 25J:
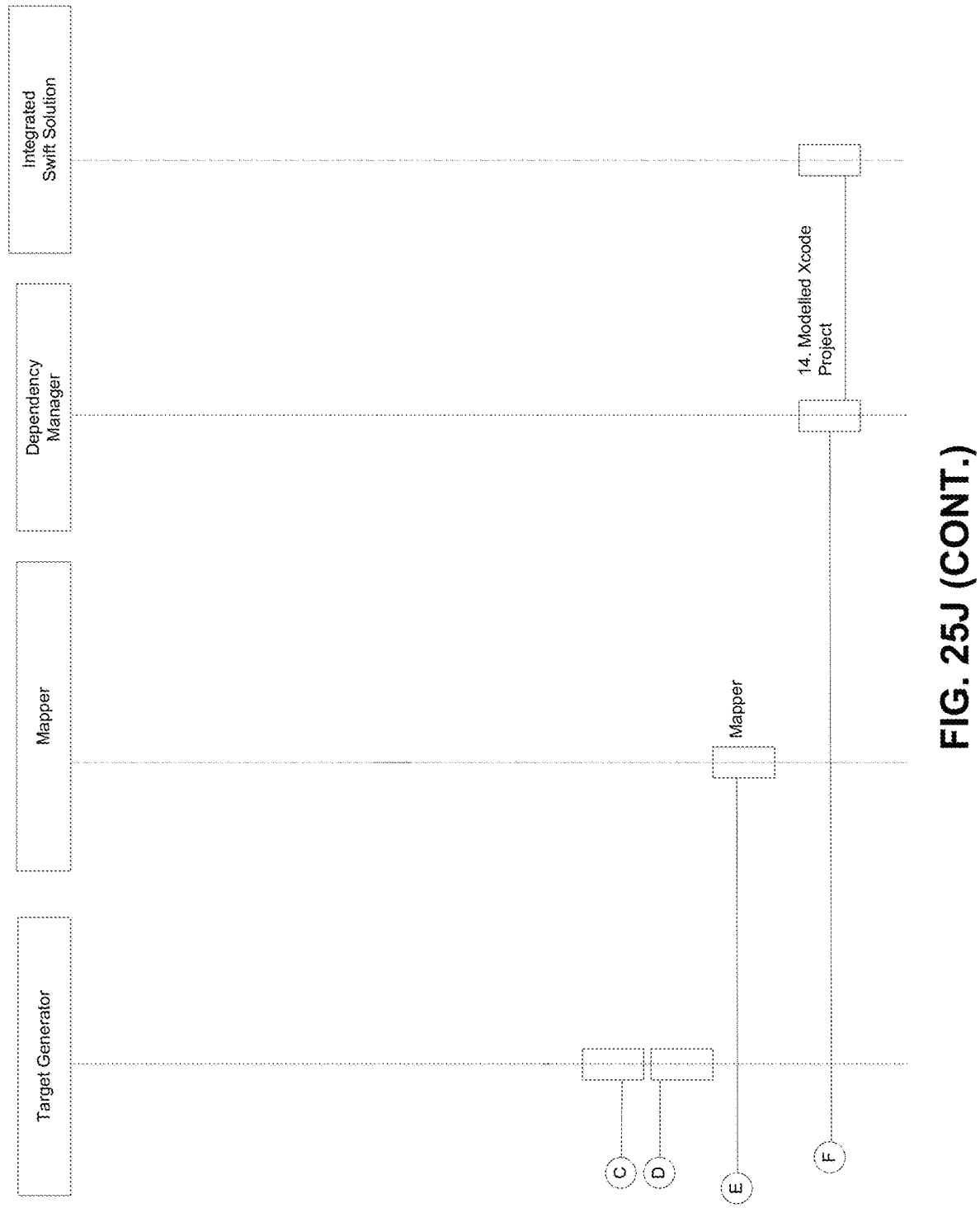

Referring to FIG. 25J, an end to end scenario for WATCHOS™ target is illustrated. The various steps of the flow are listed as 1-15, beginning from selection of project tab at step 1, and concluding at notifying user at step 15.

Figure 25K:
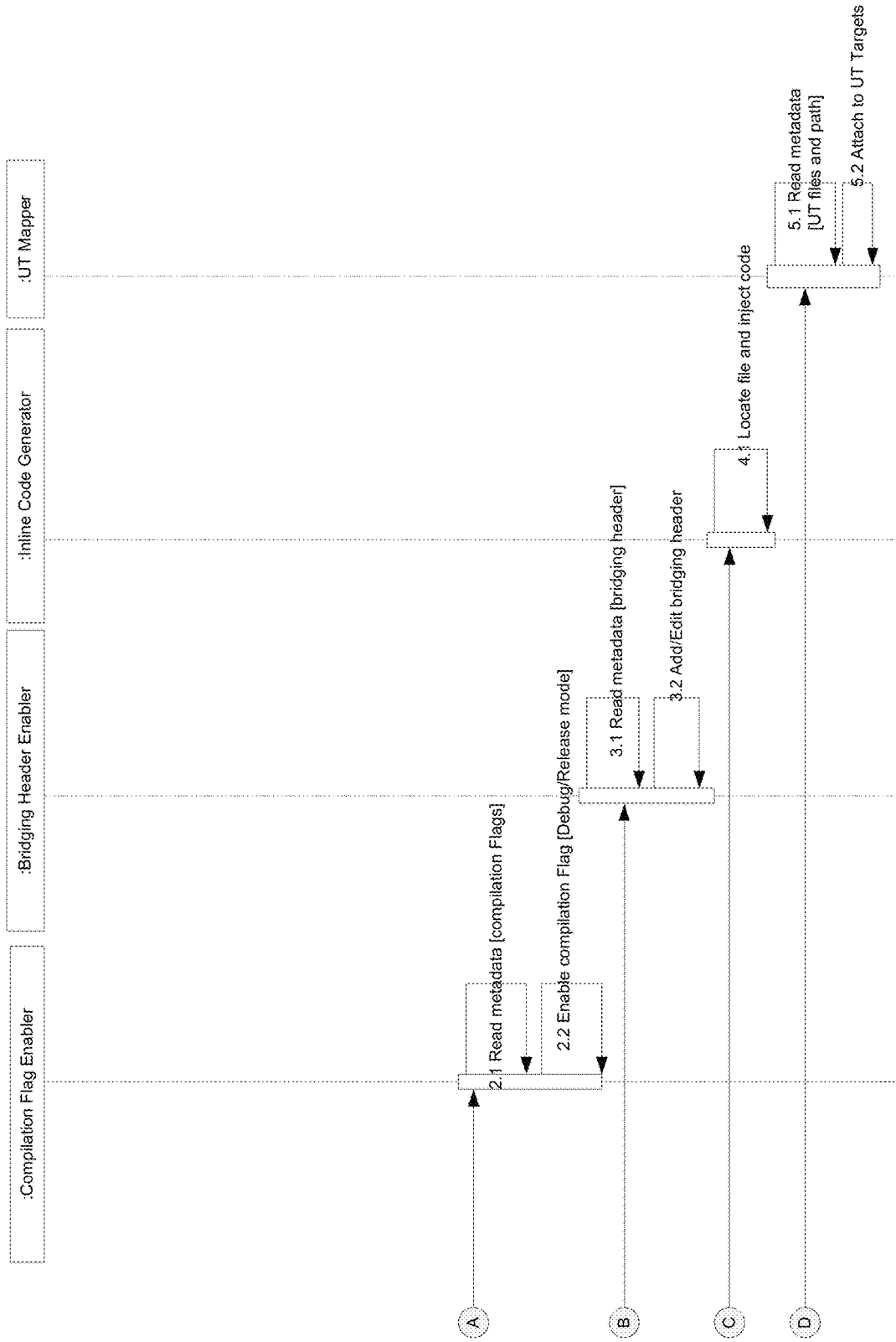

Referring to FIG. 25K, a mapper extension for weather (WATCHOS™) is illustrated. The various steps of the flow are listed as 1-5, beginning from mapping files physically at step 1, and concluding at mapping of UT files to UT target at step 5.

Figure 26:
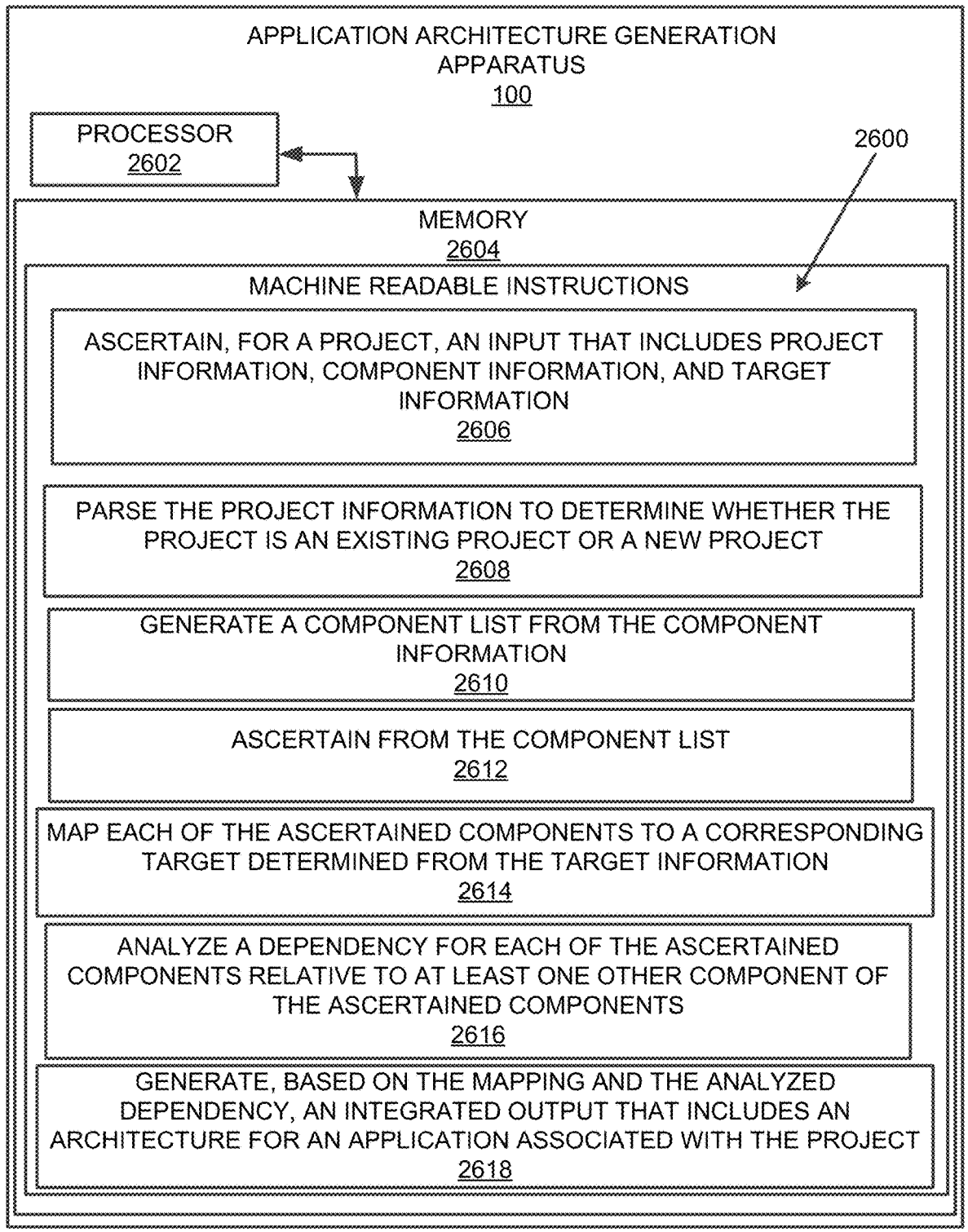
FIG. 26 illustrates an example block diagram for application architecture generation in accordance with an example of the present disclosure.
Figure 28:
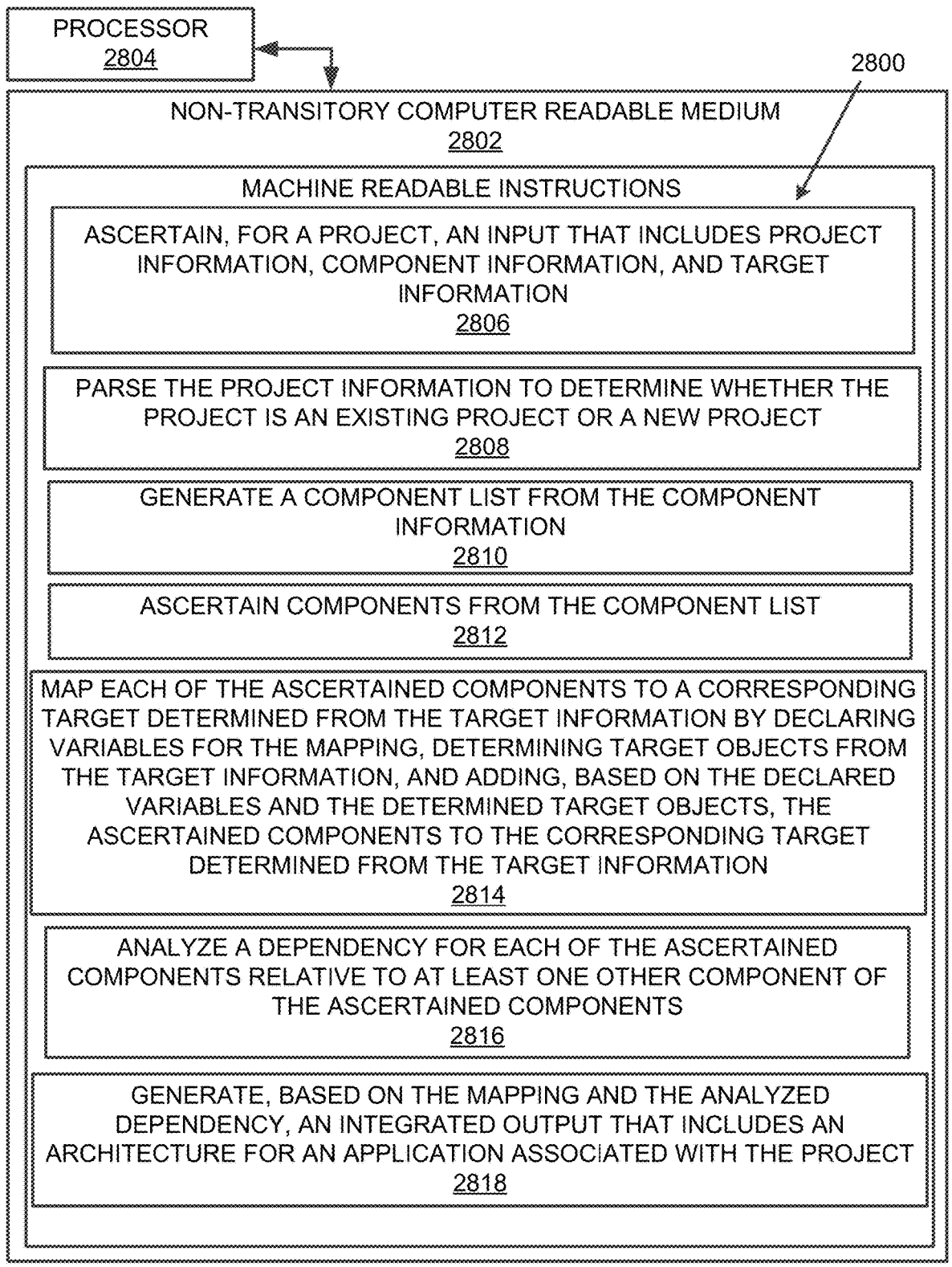
FIG. 28 illustrates a further example block diagram for application architecture generation in accordance with another example of the present disclosure.

FIGS. 26-28 respectively illustrate an example block diagram 2600, a flowchart of an example method 2700, and a further example block diagram 2800 for application architecture generation, according to examples. The block diagram 2600, the method 2700, and the block diagram 2800 may be implemented on the apparatus 100 described above with reference to FIG. 1 by way of example and not of limitation. The block diagram 2600, the method 2700, and the block diagram 2800 may be practiced in other apparatus. In addition to showing the block diagram 2600, FIG. 26 shows hardware of the apparatus 100 that may execute the instructions of the block diagram 2600. The hardware may include a processor 2602, and a memory 2604 storing machine readable instructions that when executed by the processor cause the processor to perform the instructions of the block diagram 2600. The memory 2604 may represent a non-transitory computer readable medium. FIG. 27 may represent an example method for application architecture generation, and the steps of the method. FIG. 28 may represent a non-transitory computer readable medium 2802 having stored thereon machine readable instructions to provide application architecture generation according to an example. The machine readable instructions, when executed, cause a processor 2804 to perform the instructions of the block diagram 2800 also shown in FIG. 28.

The processor 2602 of FIG. 26 and/or the processor 2804 of FIG. 28 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 2802 of FIG. 28), such as hardware storage devices (e.g., RAM (random access memory), ROM (read only memory), EPROM (erasable, programmable ROM), EEPROM (electrically erasable, programmable ROM), hard drives, and flash memory). The memory 2604 may include a RAM, where the machine readable instructions and data for a processor may reside during runtime.

Referring to FIGS. 1-26, and particularly to the block diagram 2600 shown in FIG. 26, the memory 2604 may include instructions 2606 to ascertain (e.g., by the input receiver 102 that is executed by at least one hardware processor), for the project 104, the input 106 that includes project information 108, component information 110, and target information 112.

The processor 2602 may fetch, decode, and execute the instructions 2608 to parse (e.g., by the command line input analyzer 114 that is executed by the at least one hardware processor) the project information 108 to determine whether the project 104 is an existing project or a new project.

The processor 2602 may fetch, decode, and execute the instructions 2610 to generate (e.g., by the configuration manager 116 that is executed by the at least one hardware processor) the component list 118 from the component information 110.

The processor 2602 may fetch, decode, and execute the instructions 2612 to ascertain (e.g., by the architecture modeler 120 that is executed by the at least one hardware processor) components 122 from the component list 118.

The processor 2602 may fetch, decode, and execute the instructions 2614 to map (e.g., by the mapper 128 that is executed by the at least one hardware processor) each of the ascertained components 122 to a corresponding target 126 determined from the target information 112.

The processor 2602 may fetch, decode, and execute the instructions 2616 to analyze (e.g., by the dependency manager 130 that is executed by the at least one hardware processor) a dependency for each of the ascertained components 122 relative to at least one other component of the ascertained components 122.

The processor 2602 may fetch, decode, and execute the instructions 2618 to generate (e.g., by the integrated output generator 132 that is executed by the at least one hardware processor), based on the mapping and the analyzed dependency, an integrated output 134 that includes an architecture for the application 136 associated with the project 104.

Referring to FIGS. 1-25 and 27, and particularly FIG. 27, for the method 2700, at block 2702, the method may include ascertaining, by the input receiver 102 that is executed by at least one hardware processor, for a project 104, an input 106 that includes project information 108, component information 110, and target information 112.

At block 2704, the method may include parsing, by the command line input analyzer 114 that is executed by the at least one hardware processor, the project information 108 to determine whether the project 104 is an existing project or a new project.

At block 2706, the method may include generating, by the configuration manager 116 that is executed by the at least one hardware processor, the component list 118 from the component information 110.

At block 2708, the method may include ascertaining, by the architecture modeler 120 that is executed by the at least one hardware processor, components 122 from the component list 118.

At block 2710, the method may include mapping, by the mapper 128 that is executed by the at least one hardware processor, each of the ascertained components 122 to the corresponding target 126 determined from the target information 112 by attaching, based on an installation path, a file associated with an ascertained component to the corresponding target.

At block 2712, the method may include analyzing, by the dependency manager 130 that is executed by the at least one hardware processor, a dependency for each of the ascertained components 122 relative to at least one other component of the ascertained components 122.

At block 2714, the method may include generating, by the integrated output generator 132 that is executed by the at least one hardware processor, based on the mapping and the analyzed dependency, the integrated output 134 that includes an architecture for the application 136 associated with the project 104.

Referring to FIGS. 1-25 and 28, and particularly FIG. 28, for the block diagram 2800, the non-transitory computer readable medium 2802 may include instructions 2806 to ascertain, for the project 104, the input 106 that includes project information 108, component information 110, and target information 112.

The processor 2804 may fetch, decode, and execute the instructions 2808 to parse the project information 108 to determine whether the project 104 is an existing project or a new project.

The processor 2804 may fetch, decode, and execute the instructions 2810 to generate the component list 118 from the component information 110.

The processor 2804 may fetch, decode, and execute the instructions 2812 to ascertain components 122 from the component list 118.

The processor 2804 may fetch, decode, and execute the instructions 2814 to map each of the ascertained components 122 to the corresponding target 126 determined from the target information 112 by declaring variables for the mapping, determining target objects from the target information 112, and adding, based on the declared variables and the determined target objects, the ascertained components 122 to the corresponding target 126 determined from the target information 112.

The processor 2804 may fetch, decode, and execute the instructions 2816 to analyze a dependency for each of the ascertained components 122 relative to at least one other component of the ascertained components 122.

The processor 2804 may fetch, decode, and execute the instructions 2818 to generate, based on the mapping and the analyzed dependency, the integrated output 134 that includes an architecture for the application 136 associated with the project 104.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An application architecture generation apparatus comprising:
at least one hardware processor;
an input receiver, executed by the at least one hardware processor, to
ascertain, for a project, an input that includes project information, component information, and target information;
a command line input analyzer, executed by the at least one hardware processor, to
parse the project information to determine whether the project is an existing project or a new project;
a configuration manager, executed by the at least one hardware processor, to generate a component list from the component information;

an architecture modeler, executed by the at least one hardware processor, to ascertain components from the component list;

a mapper, executed by the at least one hardware processor, to map each of the ascertained components to a corresponding target determined from the target information by declaring variables for the mapping, determining target objects from the target information, and adding, based on the declared variables and the determined target objects, the ascertained components to the corresponding target determined from the target information;

a dependency manager, executed by the at least one hardware processor, to analyze a dependency for each of the ascertained components relative to at least one other component of the ascertained components; and an integrated output generator, executed by the at least one hardware processor, to generate, based on the mapping and the analyzed dependency, an integrated output that includes an architecture for an application associated with the project, wherein a unit test target and user interface test target are generated for each of the ascertained components to be tested, a unit test mapper reads the component list and identifies the ascertained components, and a test file and a user interface test file are respectively mapped to the unit test target and user interface test target for testing, by the unit test mapper, code generated by the mapper that maps each of the ascertained components.

2. The application architecture generation apparatus according to claim 1, wherein, in response to a determination that the project is the new project, the architecture modeler is executed by the at least one hardware processor to ascertain the components from the component list and architecture templates associated with the project, and for each of the ascertained components,
generate the corresponding target determined from the target information, wherein the corresponding target includes a base project target.

3. The application architecture generation apparatus according to claim 1, wherein the target is at least one of a watch, a mobile phone, or a television.

4. The application architecture generation apparatus according to claim 1, wherein the mapper is executed by the at least one hardware processor to map each of the ascertained components to the corresponding target determined from the target information by attaching, based on an installation path, a file associated with an ascertained component to the corresponding target, and wherein the ascertained components are at least one of a display of a particular feature, or an evaluation of the particular feature.

5. The application architecture generation apparatus according to claim 1, wherein the mapper is executed by the at least one hardware processor to map each of the ascertained components to the corresponding target determined from the target information by enabling a debugger flag with respect to the corresponding target.

6. The application architecture generation apparatus according to claim 1, wherein the mapper is executed by the at least one hardware processor to map each of the ascertained components to the corresponding target determined from the target information by adding inline code with respect to the corresponding target.

7. The application architecture generation apparatus according to claim 1, wherein the mapper is executed by the at least one hardware processor to map each of the ascertained components to the corresponding target determined from the target information by adding a bridging header with respect to the corresponding target.

8. The application architecture generation apparatus according to claim 1, wherein the dependency manager is executed by the at least one hardware processor to analyze the dependency for each of the ascertained components relative to at least one other component of the ascertained components, and create or update a dependency based on the dependency analysis.

9. A method for application architecture generation comprising:

ascertaining, by an input receiver that is executed by at least one hardware processor, for a project, an input that includes project information, component information, and target information;

parsing, by a command line input analyzer that is executed by the at least one hardware processor, the project information to determine whether the project is an existing project or a new project;

generating, by a configuration manager that is executed by the at least one hardware processor, a component list from the component information;

ascertaining, by an architecture modeler that is executed by the at least one hardware processor, components from the component list;

mapping, by a mapper that is executed by the at least one hardware processor, each of the ascertained components to a corresponding target determined from the target information by declaring variables for the mapping, determining target objects from the target information, and adding, based on the declared variables and the determined target objects, the ascertained components to the corresponding target determined from the target information and by attaching, based on an installation path, a file associated with an ascertained component of the ascertained components to the corresponding target;

analyzing, by a dependency manager that is executed by the at least one hardware processor, a dependency for each of the ascertained components relative to at least one other component of the ascertained components; and generating, by an integrated output generator that is executed by the at least one hardware processor, based on the mapping and the analyzed dependency, an integrated output that includes an architecture for an application associated with the project, wherein a unit test target and user interface test target are generated for each of the ascertained components to be tested, a unit test mapper reads the component list and identifies the ascertained components, and a test file and a user interface test file are respectively mapped to the unit test target and user interface test target for testing, by the unit test mapper, code generated by the mapper that maps each of the ascertained components.

10. The method according to claim 9, wherein, in response to a determination that the project is the new project, further comprising:

ascertaining, by the architecture modeler that is executed by the at least one hardware processor, the components from the component list and architecture templates associated with the project; and for each of the ascertained components, generating, by the architecture modeler that is executed by the at least one hardware processor, the corresponding target determined from the target information.

11. The method according to claim 9, wherein the target is at least one of a watch, a mobile phone, or a television.

12. The method according to claim 9, wherein mapping, by the mapper that is executed by the at least one hardware processor, each of the ascertained components to the corresponding target determined from the target information further comprises enabling a debugger flag with respect to the corresponding target.

13. The method according to claim 9, wherein mapping, by the mapper that is executed by the at least one hardware processor, each of the ascertained components to the corresponding target determined from the target information further comprises adding inline code with respect to the corresponding target.

14. A non-transitory computer readable medium having stored thereon machine readable instructions, the machine readable instructions, when executed by at least one hardware processor, cause the at least one hardware processor to:
ascertain, for a project, an input that includes project information, component information, and target information;
parse the project information to determine whether the project is an existing project or a new project;
generate a component list from the component information;
ascertain components from the component list;
map each of the ascertained components to a corresponding target determined from the target information by
declaring variables for the mapping,
determining target objects from the target information, and
adding, based on the declared variables and the determined target objects, the ascertained components to the corresponding target determined from the target information;
analyze a dependency for each of the ascertained components relative to at least one other component of the ascertained components; and
generate, based on the mapping and the analyzed dependency, an integrated output that includes an architecture for an application associated with the project, wherein a unit test target and user interface test target are generated for each of the ascertained components to be tested, a unit test mapper reads the component list and identifies the ascertained components, and a test file and a user interface test file are respectively mapped to the unit test target and user interface test target for testing, by the unit test mapper, code generated by a mapper that maps each of the ascertained components.

15. The non-transitory computer readable medium according to claim 14, wherein the target is at least one of a watch, a mobile phone, or a television.

16. The non-transitory computer readable medium according to claim 14, wherein, in response to a determination that the project is the new project, the instructions are further to cause the at least one hardware processor to:
ascertain the components from the component list and architecture templates associated with the project; and
for each of the ascertained components, generate the corresponding target determined from the target information.

17. The non-transitory computer readable medium according to claim 14, wherein the instructions are further to cause the at least one hardware processor to:
add a bridging header with respect to the corresponding target.

18. The non-transitory computer readable medium according to claim 14, wherein the instructions are further to cause the at least one hardware processor to:
create or update a dependency based on the dependency analysis.

\* \* \* \* \*